United States Patent
Hashimoto

(10) Patent No.: US 9,282,528 B2
(45) Date of Patent: Mar. 8, 2016

(54) APPARATUS AND METHOD FOR DETECTING A LOCATION OF A MOBILE STATION IN A MOBILE COMMUNICATION SYSTEM

(71) Applicant: FUJITSU LIMITED, Kawasaki-shi, Kanagawa (JP)

(72) Inventor: Masanori Hashimoto, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 238 days.

(21) Appl. No.: 13/775,498

(22) Filed: Feb. 25, 2013

(65) Prior Publication Data

US 2013/0260787 A1    Oct. 3, 2013

(30) Foreign Application Priority Data

Mar. 30, 2012   (JP) ................................. 2012-082467

(51) Int. Cl.
*H04W 64/00* (2009.01)
*G01S 5/02* (2010.01)

(52) U.S. Cl.
CPC ............. *H04W 64/00* (2013.01); *G01S 5/0252* (2013.01)

(58) Field of Classification Search
CPC ..... H04W 52/00; H04W 52/02; H04W 52/04; H04W 52/06; H04W 52/14; H04W 52/16; H04W 4/02; H04W 4/22
USPC ........ 455/456.1–457, 404.1, 404.2, 552, 574, 455/127.1, 127.5, 343.5
See application file for complete search history.

(56) References Cited

U.S. PATENT DOCUMENTS

| | | | |
|---|---|---|---|
| 2005/0014518 A1* | 1/2005 | Spain et al. | 455/456.5 |
| 2005/0246334 A1* | 11/2005 | Tao et al. | 707/5 |
| 2008/0146161 A1* | 6/2008 | Bugenhagen | 455/67.11 |

FOREIGN PATENT DOCUMENTS

JP    07-231473    8/1995

* cited by examiner

*Primary Examiner* — Vladimir Magloire
*Assistant Examiner* — Erica Navar
(74) *Attorney, Agent, or Firm* — Myers Wolin, LLC

(57) ABSTRACT

In a mobile communication system, a mobile-station location information management device creates plural transmission-power output data-sets including individual pieces of transmission-power data of plural base-stations with changing the transmission-power of the plural base-stations; creates plural reception-power data-tables individually corresponding to the created plural transmission-power output data-sets and each including plural pieces of divided-area data individually corresponding to plural individual divided-areas within a location-detection target area where each piece of divided-area data includes reception-power data of signals transmitted from the plural base-stations; selects a reception-power data table corresponding to the changed transmission-power data-set from among the created plural reception-power data-tables when the transmission-power of the plural base-stations are changed after the mobile-station has moved into the location-detection target area; and detects, as a location of the mobile-station, an area indicated by divided-area data where a difference from a reception-power data-set received from the mobile-station is slight, within the selected reception-power data-table.

9 Claims, 17 Drawing Sheets

FIG. 10

| BASE STATION NUMBER | | | | | RECEPTION POWER DATA TABLE NUMBER |
|---|---|---|---|---|---|
| 1 | 2 | 3 | ····· | k | |
| −30 | −30 | −30 | ····· | −30 | 101 |
| −27 | −30 | −30 | ····· | −30 | 102 |
| −24 | −30 | −30 | ····· | −30 | 103 |
| ⋮ | ⋮ | ⋮ | ····· | ⋮ | ⋮ |
| 0 | −30 | −30 | ····· | −30 | 111 |
| −30 | −27 | −30 | ····· | −30 | 201 |
| −30 | −24 | −30 | ····· | −30 | 202 |
| ⋮ | ⋮ | ⋮ | ····· | ⋮ | ⋮ |
| −30 | 0 | −30 | ····· | −30 | 211 |
| −30 | −30 | −27 | ····· | −30 | 301 |
| ⋮ | ⋮ | ⋮ | ····· | ⋮ | ⋮ |
| −30 | −30 | 0 | ····· | −30 | 311 |
| ⋮ | ⋮ | ⋮ | ····· | ⋮ | |
| 0 | 0 | 0 | ····· | 0 | xxx |

FIG. 11

| 101 | 1 | 2 | ...(m) | 15 |
|---|---|---|---|---|
| 1 | (−70, −70, −40,..., −70) | (−68, −70, −44,..., −70) | ... | (−44, −70, −68,..., −70) |
| 2 | (−70, −68, −44,..., −69) | (−68, −68, −46,..., −69) | ... | (−44, −70, −68,..., −69) |
| ...(n) | ... | ... | (R101-mn1, R101-mn2, R101-mn3,..., R101-mnk) | ... |
| 10 | (−70, −50, −70,..., −50) | (−68, −50, −70,..., −50) | ... | (−44, −50, −70,..., −50) |

102

103

APPARATUS AND METHOD FOR DETECTING A LOCATION OF A MOBILE STATION IN A MOBILE COMMUNICATION SYSTEM

CROSS-REFERENCE TO RELATED APPLICATION

This application is based upon and claims the benefit of priority of the prior Japanese Patent Application No. 2012-082467, filed on Mar. 30, 2012, the entire contents of which are incorporated herein by reference.

FIELD

The embodiments discussed herein are related to apparatus and method for detecting a location of a mobile station in a mobile communication system.

BACKGROUND

In recent years, various kinds of application software have been studied and developed that provide information in line with the location of a mobile station belonging to a mobile communication system. As examples of the mobile station, a mobile phone, a personal digital assistance device, and the like may be cited. So as to realize provision of information utilizing such application software, it is desirable to accurately obtain a location where the mobile station exists.

In addition, there is the following technique for specifying the location of a wireless terminal. In other words, a rectangular-shaped regional area serving as the area of the candidate location of the wireless terminal is divided into a plurality of grid-like areas. The signal intensity of a control channel having given power and being broadcast from each of a plurality of base stations is measured at each location within the regional area. Each location where the measurement has been performed and the element of each measured signal intensity are stored in a database with being associated with each other. In addition, the measurement values of the intensities of signals that have been received from the plural base stations by the wireless terminal and signal intensity elements within the database are subjected to pattern matching, and hence, the location of the wireless terminal is specified.

In addition, there is the following technique for specifying the location of the mobile station. In other words, in each region within a service area, the received electric field level of a control channel transmitted from each of a within-area base station and a plurality of neighboring base stations is measured in a reference mobile station. Using the measured received electric field level, a location information center calculates the relative received electric field level of each base station with respect to the within-area base station, and preliminarily stores the calculated relative received electric field level of each base station and the information on each base station in a database with associating the calculated relative received electric field level of each base station and the information on each base station with each location where the measurement has been performed. In addition, in the detection of the location of the mobile station, the received electric field level of a control channel transmitted from each of a plurality of base stations is measured in the mobile station. The location information center determines a within-area base station on the basis of the measured received electric field level, and calculates the relative received electric field level of each base station with respect to the determined within-area base station. The location information center detects the location of the mobile station on the basis of data where a difference between the calculated relative received electric field level and the relative received electric field level of the within-area base station preliminarily stored in the database becomes a minimum.

Such techniques are disclosed in Japanese National Publication of International Patent Application No. 2007-532026 and Japanese Laid-open Patent Publication No. 7-231473.

SUMMARY

According to an aspect of the invention, a system includes a mobile station, plural base stations each configured to be directly connectable to the mobile station, a base station management device configured to change transmission power of the plural base stations in response to a communication state of a wireless network between the mobile station and the plural base stations, and a mobile station location information management device configured to manage location information of the mobile station. The mobile station location information management device creates a plurality of transmission power output data sets including individual pieces of transmission power data of the plural base stations with changing the transmission power of the plural base stations, and creates a plurality of reception power data tables configured to individually correspond to the created plurality of transmission power output data sets wherein each of the plurality of reception power data tables includes plural pieces of divided area data, each of which includes reception power data of signals transmitted from the plural base stations, where the plural pieces of divided area data individually correspond to a plurality of individual divided areas within a location detection target area where communication is covered by the plural base stations. The mobile station location information management device receives a changed transmission power data set including individual pieces of changed transmission power data of the plural base stations from the base station management device and selects a reception power data table corresponding to the received changed transmission power data set from among the created plurality of reception power data tables when the base station management device has changed the transmission power of the plural base stations after the mobile station has moved into the location detection target area. Upon receiving a request for providing location information of the mobile station from an external device, The mobile station location information management device instructs the mobile station to measure, in a location where the mobile station exists, pieces of reception power data of individual signals transmitted from the plural base stations with the changed transmission power; and receives a reception power data set including the individual pieces of reception power data measured by the mobile station, detects, as a specific location where the mobile station exists, a specific area indicated by divided area data where a difference with respect to the received reception power data set is slight, within the selected reception power data table, and transmits information indicating the detected specific location to the external device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 is an exemplified diagram of a transmission power data set table, according to an embodiment;

FIG. 11 is an exemplified diagram of a reception power data table, according to an embodiment;

DESCRIPTION OF EMBODIMENTS

As indoor space, such as space in a building or an underground mall, and in a region behind a building, there may be an area that is difficult for a base station installed outdoors to cover as a communication area. So as to enable communication in such an area, a plurality of small base stations may be installed that have less transmission power. In addition, so as to perform provision of information for a mobile station existing in a specific region, a plurality of small base stations may be installed that have less transmission power.

When the communication area is covered by installing plural small base stations, in order to reduce radio wave interference between small base stations, setting is performed so that the reception power of a radio wave from each small base station becomes small in the vicinity of the cell edge of the small base station. Therefore, it becomes difficult for a mobile station existing in a location where the reception power of the radio wave is small to smoothly connect to the small base station, or even if it is possible for the mobile station to connect to the small base station, throughput degrades.

Therefore, so as to reduce a communication area where it becomes difficult to perform smooth connection or throughput degrades, there has been proposed a technique for arbitrarily adjusting the transmission power of each small base station and automatically adjusting of the range of the cell of each small base station. For example, this technique has been proposed as one function of an optimization technique for a wireless communication network, referred to as a Self-Organization Network (SON) in Long term Evolution (LTE) serving as a mobile communication standard.

In such a mobile communication system where the transmission power of the base station is adjusted, for example, so as to realize providing information in line with the location of a mobile station as described above, it is desirable that the location of the mobile station is accurately obtained.

However, in the location estimation method for a mobile station, described above as a technique of the related art, the database is preliminarily prepared that is based on the given transmission power of a base station, and the transmission power of a base station is not scheduled to be arbitrarily changed. Therefore, in the location estimation method for a mobile station, described above as a technique of the related art, when the transmission power of a base station has been changed, it may be difficult to accurately detect the location of a mobile station even if the preliminarily prepared database is used.

Hereinafter, embodiments will be described in detail with reference to drawings.

Figure 1:
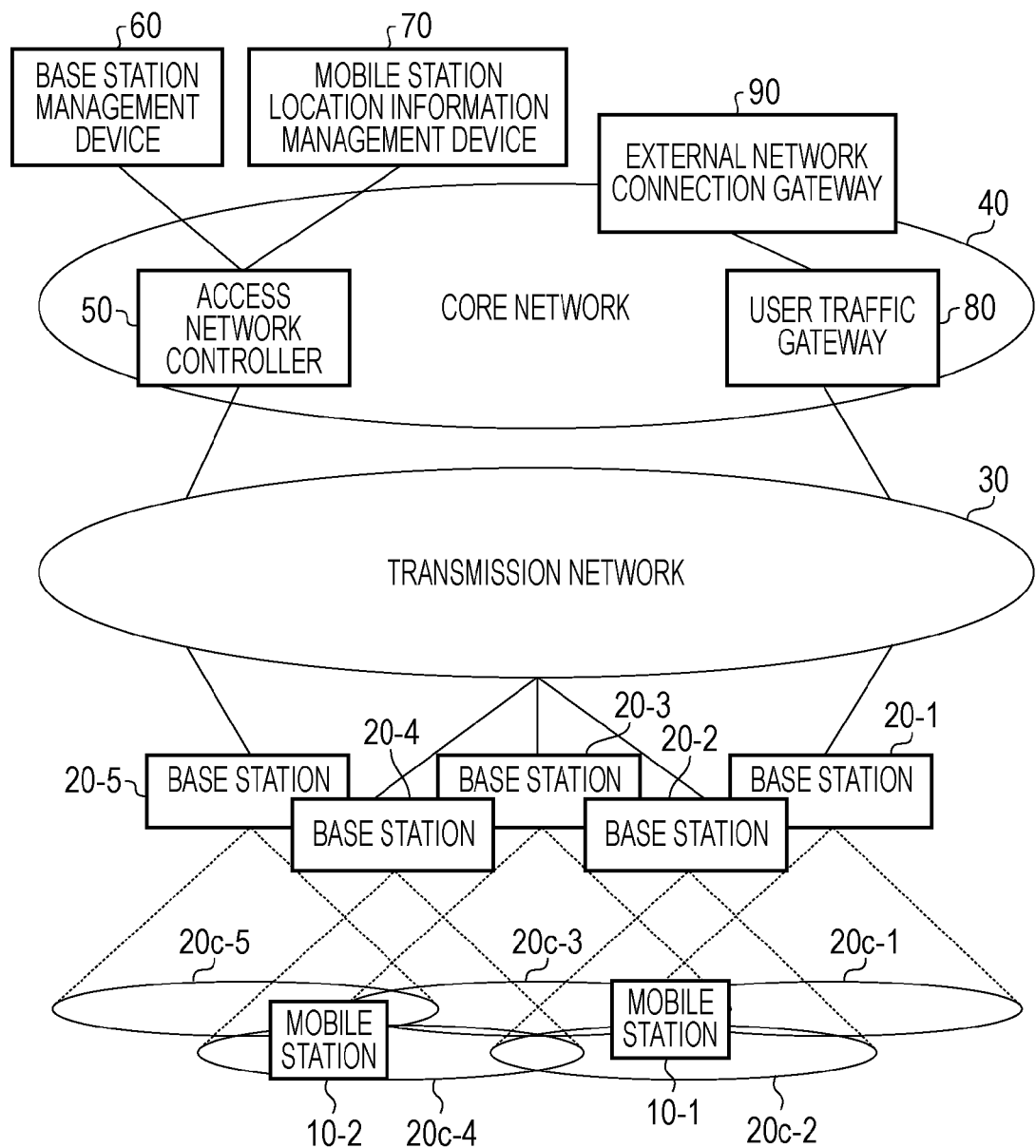
FIG. 1 is an exemplified diagram of a configuration of a mobile communication system, according to an embodiment.

FIG. 1 is an exemplified diagram of a configuration of a mobile communication system, according to an embodiment.

A mobile communication system 1 illustrated in FIG. 1 includes mobile stations 10-1 and 10-2, base stations 20-1 to 20-5, a transmission network 30, and a core network 40.

In addition, in FIG. 1, the two mobile stations 10-1 and 10-2 and the five base stations 20-1 to 20-5 are illustrated. However, the number of the mobile stations 10 and the number of the base stations 20 included in the mobile communication system 1 are not limited to these numbers. In the following description, when not being distinguished, the mobile stations 10-1 and 10-2 are expressed as mobile stations 10. In addition, when not being distinguished, the base stations 20-1 to 20-5 are expressed as base stations 20.

The mobile station 10 is, for example, a User Equipment (UE) in LTE. The base station 20 is, for example, a Home eNodeB (HeNB). A base station 20 may directly connect to the mobile station 10 located within the cell of the base station 20. In the mobile communication system 1 illustrated in FIG. 1, a base station 20-2 may connect to the mobile station 10-1 existing within the cell 20c-2 of the base station 20-2. In addition, a base station 20-4 may connect to the mobile station 10-2 existing within the cell 20c-4 of the base station 20-4. In the following description, when not being distinguished, the cells 20c-1 to 20c-5 are expressed as cells 20c.

The transmission network 30 is, for example, an Internet Protocol (IP) network interconnecting the plural base stations 20 and each device in the core network 40. The transmission network 30 is, for example, an S1/X2 flex Network. The transmission network 30 may include transmission devices (not illustrated) connecting network devices to one another.

The core network 40 is an access control network. The core network 40 includes an access network controller 50, a base station management device 60, a mobile station location information management device 70, a user traffic gateway 80, and an external network connection gateway 90.

The access network control unit 50 is a device performing control for an access network, such as establishment of connection between the mobile station 10 and the base station 20 and handover control, and, for example, a Mobility Management Entity (MME).

The base station management device 60 is a device that acquires communication quality data relating to the base station 20 and the mobile station 10 connected to the base station 20 and monitors and controls the operation of the base station 20. The monitoring and control performed by the base station management device 60 include processing for adjusting the transmission power of each base station 20 so as to optimize the communication state of a wireless network between the mobile station 10 and the base station 20. The base station management device 60 is, for example, a HeNB-Management System (MS).

The mobile station location information management device 70 is a device that manages the location information of a mobile station existing within a location detection target area covered by the base station 20. In addition, the mobile station location information management device 70 is a device that detects the specific area (specific location) of the mobile station 10 existing within the location detection target area, in accordance with a location detection method for a mobile station according to the embodiment.

The location detection target area is a communication area covered by the base station 20 that is managed and controlled by the same base station management device 60. In addition, the location detection target area is, for example, a geographic area where provision of information due to application software is performed in response to a location in which the mobile station 10 connecting to the base station 20 exists.

The detail of the location detection processing according to the embodiment, which is performed by the mobile communication system 1 including the mobile station location information management device 70, will be described later. The mobile station location information management device 70 is, for example, a UE-Location Center (LC).

In addition, in the mobile communication system 1 illustrated in FIG. 1, the access network control unit 50, the base station management device 60, and the mobile station location information management device 70 are expressed as separate devices. However, functions provided for these devices may also be configured so as to be implemented into one device such as, for example, a network monitoring device.

The user traffic gateway 80 is a device relaying user packet data with the external network connection gateway 90, and, for example, a Serving-Gateway (S-GW).

The external network connection gateway 90 is a device executing processing for connecting to the external Internet, an intranet, or the like, and, for example, a Packet data network-Gateway (P-GW). The external network connection gateway 90 may connect to a device external to the mobile communication system 1. As the device external to the mobile communication system 1, for example, a device may be cited that executes processing in accordance with application software providing information to the mobile station 10 existing in a specific area within the location detection target area.

Examples of the functional configurations of the base station 20, the access network controller 50, the base station management device 60, and the mobile station location information management device 70 included in the mobile communication system 1 will be described with reference to FIG. 2 to FIG. 6.

Figure 2:
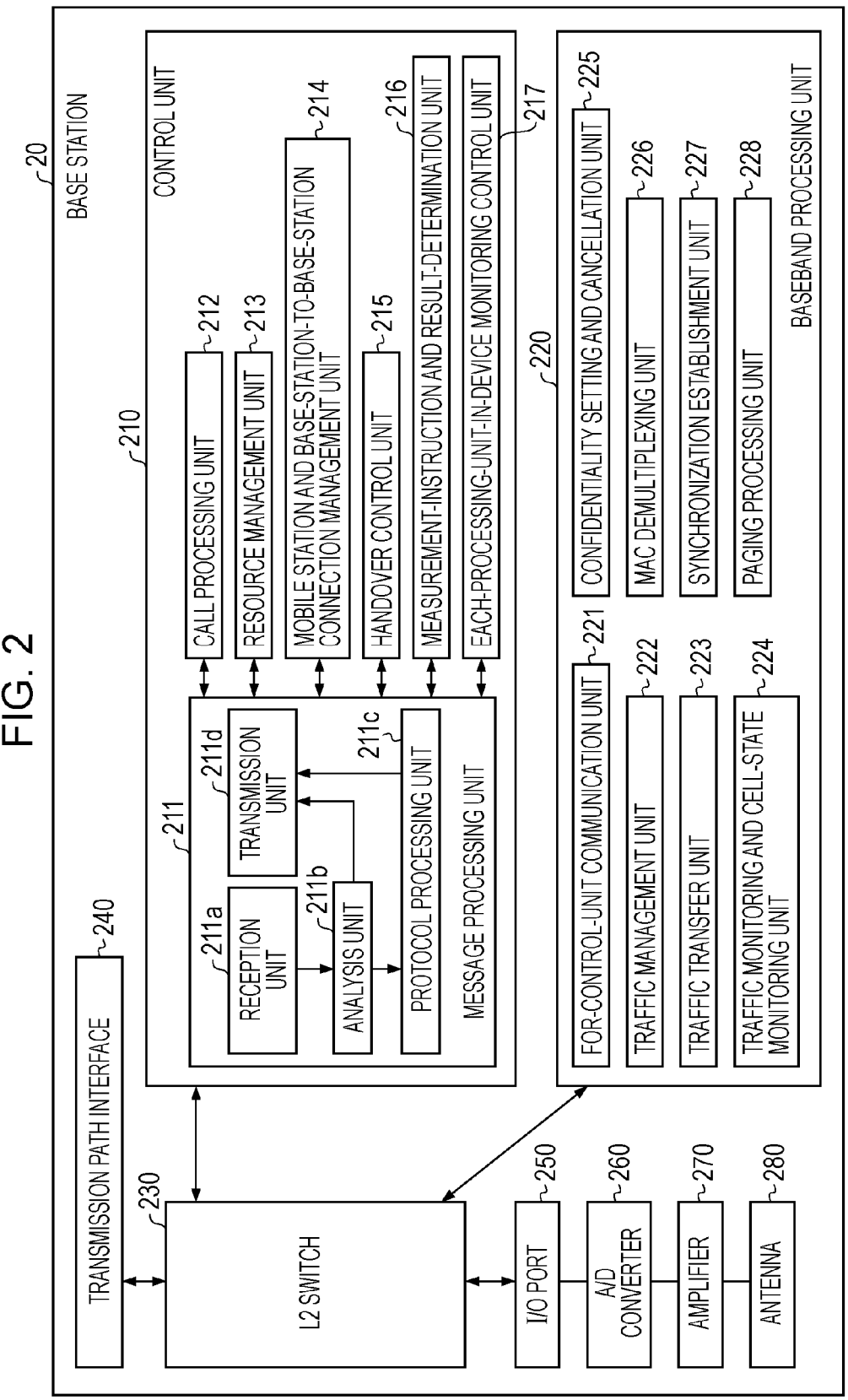
FIG. 2 is a diagram illustrating an example of a functional configuration of a base station, according to an embodiment.

FIG. 2 is a functional configuration diagram of a base station, according to an embodiment. The base station 20 illustrated in FIG. 2 includes a control unit 210, a baseband processing unit 220, a layer 2 (L2) switch 230, a transmission path interface 240, an Input/output (I/O) port 250, an Analog/Digital (ND) converter 260, an amplifier 270, and an antenna 280.

The control unit 210 controls the whole base station 20, and executes the processing operations of individual units 211 to 217 included in the control unit 210, in accordance with a predetermined communication protocol. The control unit 210 includes a message processing unit 211, a call processing unit 212, a resource management unit 213, a mobile station and base-station-to-base-station connection management unit 214, a handover control unit 215, a measurement-instruction and result-determination unit 216, and an each-processing-unit-in-device monitoring control unit 217. The message management unit 211 includes a reception unit 211a, an analysis unit 211b, a protocol processing unit 211c, and a transmission unit 211d. The control unit 210 is, for example, a Central Processing Unit (CPU).

The baseband processing unit 220 performs processing for a baseband signal between an IP packet received through the transmission path interface 240 and a wireless signal to be headed to the mobile station 10. The baseband processing unit 220 includes a for-control-unit communication unit 221, a traffic management unit 222, a traffic transfer unit 223, a traffic monitoring and cell-state monitoring unit 224, a confidentiality setting and cancellation unit 225, a Media Access Control (MAC) demultiplexing unit 226, a synchronization establishment unit 227, and a paging processing unit 228. The baseband processing unit 220 is, for example, a Digital Signal Processor (DSP).

The control unit 210 and the baseband processing unit 220 are connected to each other through the L2 switch 230. The baseband signal processed by the baseband processing unit 220 goes through the I/O port 250, the ND converter 260, and the amplifier 270 and is transmitted from the antenna 280 to the mobile station 10.

Figure 3:
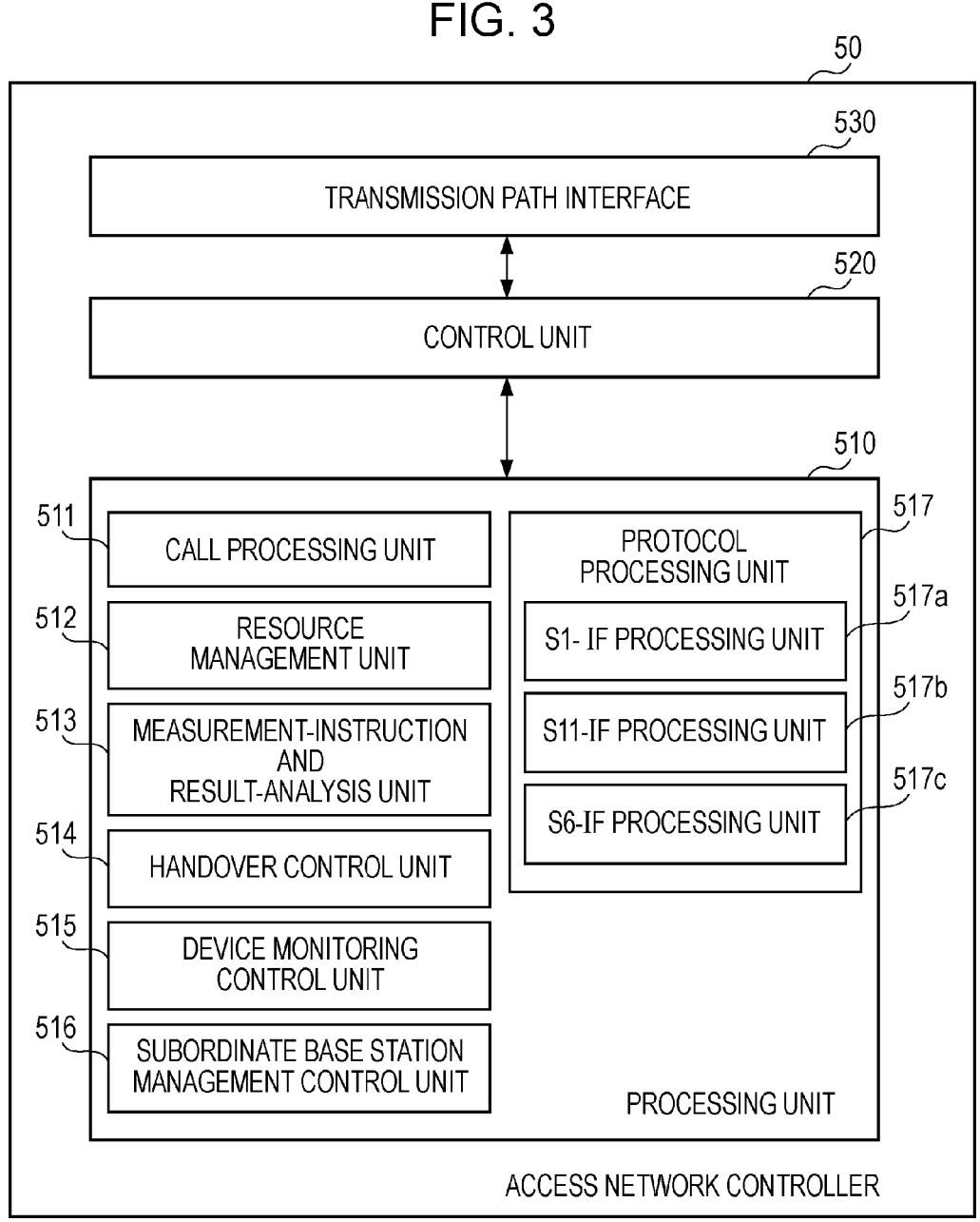
FIG. 3 is a diagram illustrating an example of a functional configuration of an access network controller, according to an embodiment.

FIG. 3 is a functional configuration diagram of an access network controller, according to an embodiment. The access network controller 50 includes a processing unit 510, a control unit 520, and a transmission path interface 530.

The processing unit 510 includes a call processing unit 511, a resource management unit 512, a measurement-instruction and result-analysis unit 513, a handover control unit 514, a device monitoring control unit 515, a subordinate base station management control unit 516, and a protocol processing unit 517. The protocol processing unit 517 includes an S1-Interface (IF) processing unit 517a, an S11-IF processing unit 517b, and an S6-IF processing unit 517c.

The control unit 520 controls the whole access network controller 50, and controls the processing operations of the individual units 511 to 517 included in the processing unit 510.

The processing unit 510 and the control unit 520 may be implemented, for example, by a CPU.

The transmission path interface 530 is an interface connecting to other devices within the core network 40, such as the mobile station location information management device 60 and the base station management device 70, and a device within the transmission network.

Figure 4:
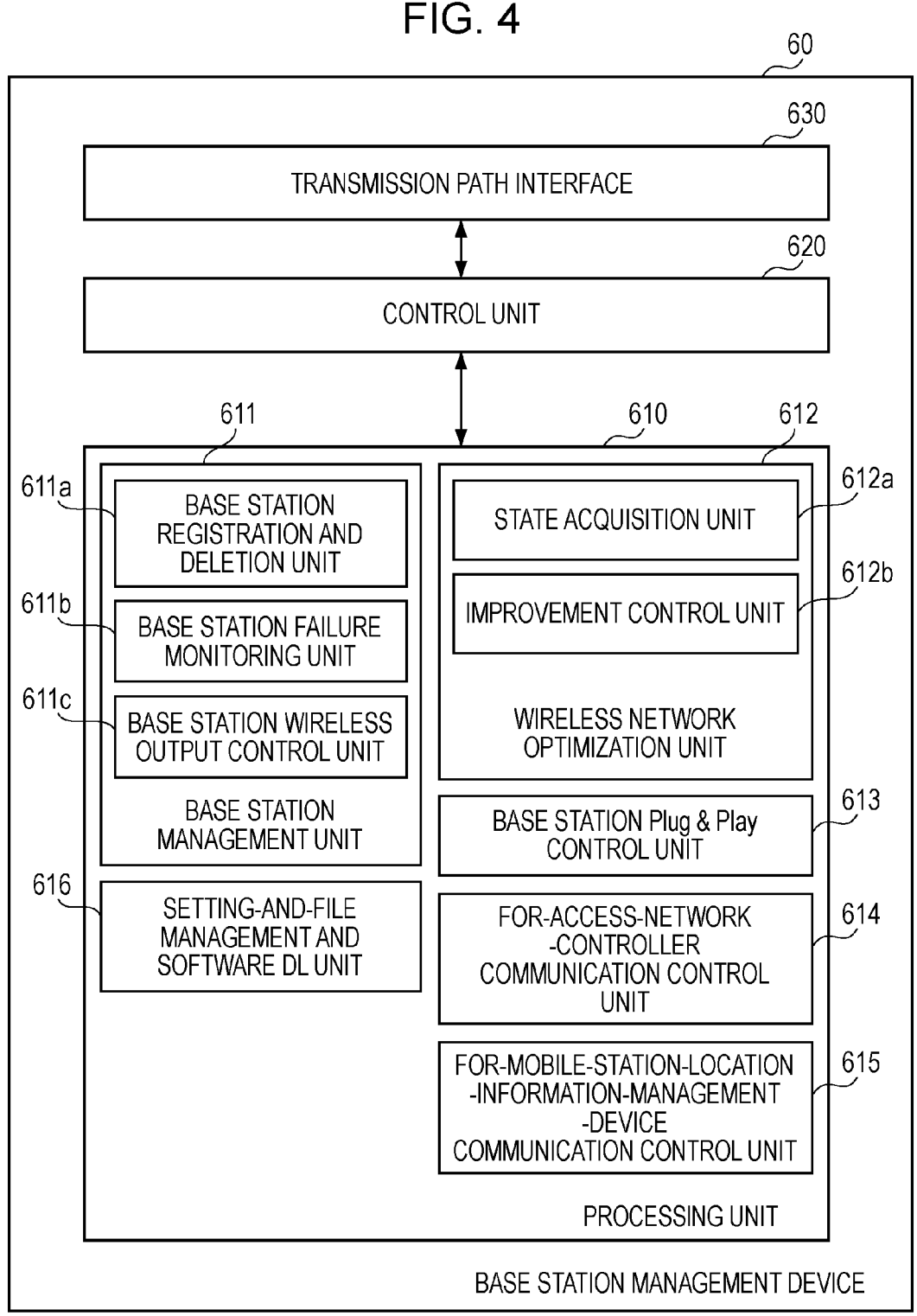
FIG. 4 is a diagram illustrating an example of a functional configuration of a base station management device, according to an embodiment.

FIG. 4 is a functional configuration diagram of a base station management device, according to an embodiment. The base station management device 60 includes a processing unit 610, a control unit 620, and a transmission path interface 630.

The processing unit 610 includes a base station management unit 611, a wireless network optimization unit 612, a base station Plug & Play control unit 613, a for-access-network-controller communication control unit 614, a for-mobile-station-location-information-management-device communication control unit 615, and a setting-and-file management and software downloading unit 616.

The base station management unit 611 manages the base station 20 installed to be under control of the base station management device 60. The base station management unit 611 includes a base station registration and deletion unit 611a, a base station failure monitoring unit 611b, and a base station wireless output control unit 611c.

By determining and changing a setting parameter such as the transmission power of the base station 20 or an antenna angle, the wireless network optimization unit 612 optimizes the communication state of a wireless network between the mobile station 10 and the base station 20. Processing due to the wireless network optimization unit 612 may be performed in each of phases: an installation phase for the base station 20, a construction phase for a wireless network, and an operation phase for the wireless network. The processing due to the wireless network optimization unit 612 may be, for example, the processing of an SON function adopted and/or studied as the function of LTE in the 3rd Generation Partnership Project (3GPP).

The wireless network optimization unit 612 includes a state acquisition unit 612a and an improvement control unit 612b.

The state acquisition unit 612a statistically acquires, in units of the cells 20 of the individual base stations 20, the data of a communication state between the mobile station 10 and the base station 20, such as the number of successes/failures in sending and receiving, the number of times a call is disconnected, the number of successes/failures in handover, and a traffic amount. In addition, the state acquisition unit 612a acquires the communication quality data of a wireless section between the mobile station 10 and the base station 20, such as the transmission power of each base station, the reception power of the signal of each base station 20, measured by the mobile station 10, or an interference signal level between base stations.

On the basis of data acquired by the state acquisition unit 612a, the improvement control unit 612b determines the communication state of a wireless network. In addition, on the basis of the determination result of the communication state of the wireless network, in accordance with a predetermined algorithm, the improvement control unit 612b changes the setting parameter of the base station 20, such as the transmission power of the base station 20, so that the communication state is improved.

The control unit 620 controls the whole base station management device 60, and controls the processing operations of the individual units 611 to 616 included in the processing unit 610.

The processing unit 610 and the control unit 620 may be implemented, for example, by a CPU.

The transmission path interface 630 is an interface connecting to another device in the core network 40, such as the access network controller 50.

Figure 5:
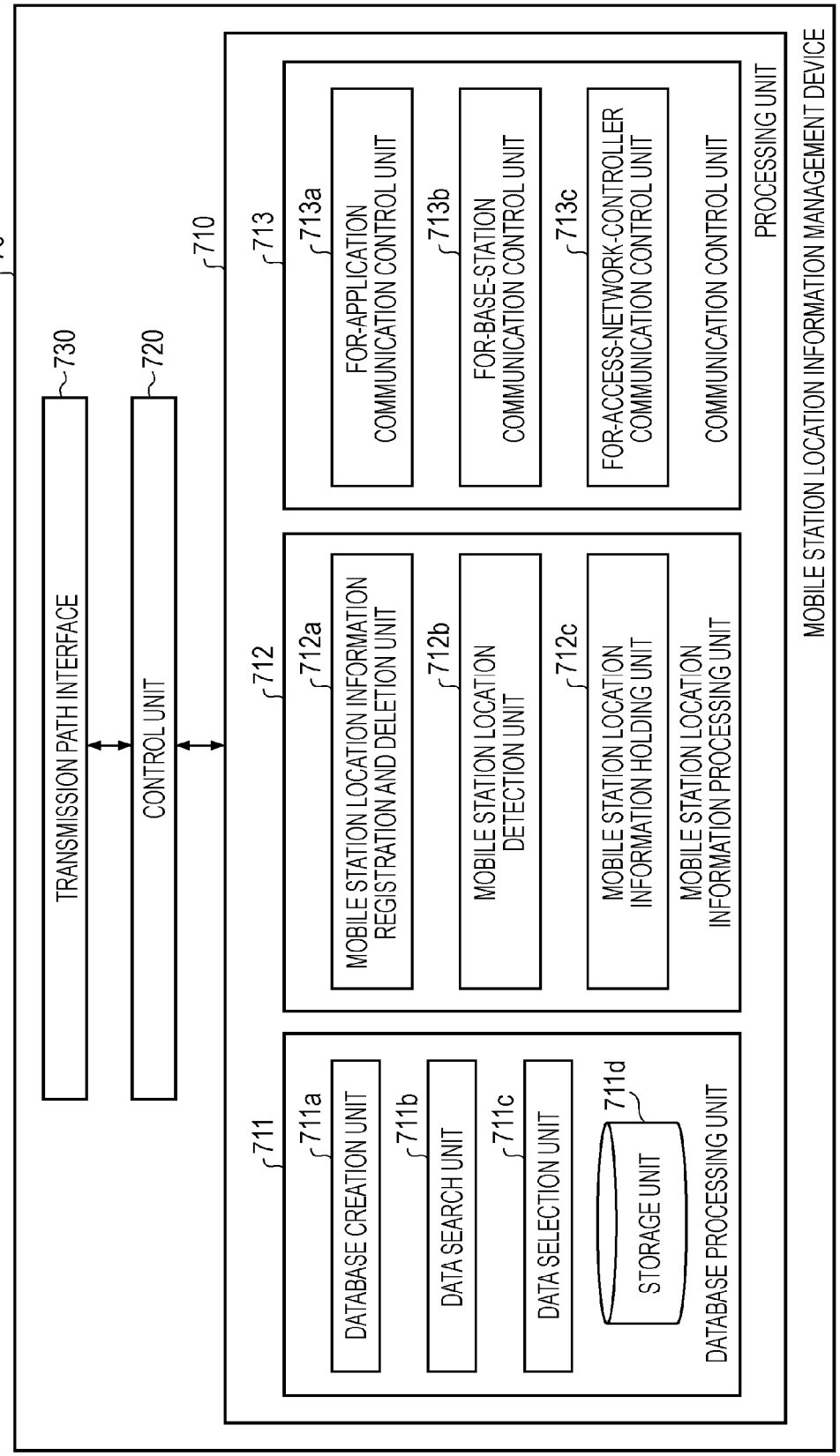
FIG. 5 is a diagram illustrating an example of a functional configuration of a mobile station location information management device, according to an embodiment.

FIG. 5 is a functional configuration diagram of a mobile station location information management device, according to an embodiment. The mobile station location information management device 70 illustrated in FIG. 5 includes a processing unit 710, a control unit 720, and a transmission path interface 730.

The processing unit 710 includes a database processing unit 711, a mobile station location information processing unit 712, and a communication control unit 713.

The database processing unit 711 includes a database creation unit 711a, a data search unit 711b, a data selection unit 711c, and a storage unit 711d.

The database creation unit 711a creates a database to be used when the mobile station location information processing unit 712 detects the specific area (specific location) of the mobile station 10 existing within the location detection target area, and records the created database in the storage unit 711d. In the embodiment, the transmission power of each base station 20 may be changed by the base station management device 60. Therefore, the database creation unit 711a creates a database complying with a change in the transmission power of each base station 20.

The data search unit 711b searches the database for data to be used when the mobile station location information processing unit 712 detects the specific area of the mobile station 10.

In response to the transmission power during operation of the base station 20, the data selection unit 711c selects and acquires, from the database, data to be used when the mobile station location information processing unit 712 detects the specific location of the mobile station 10.

The storage unit 711d stores therein the database created by the database creation unit 711a.

The mobile station location information processing unit 712 includes a mobile station location information registration and deletion unit 712a, a mobile station location detection unit 712b, and a mobile station location information holding unit 712c.

The mobile station location information registration and deletion unit 712a registers therein the location information of the mobile station 10 existing within the location detection target area. In addition, the mobile station location information registration and deletion unit 712a deletes the location information of the mobile station 10 having moved outside the location detection target area.

Using the reception power data of a radio wave received from each base station 20 by the mobile station 10 and the database recorded in the storage unit 711d, the mobile station location detection unit 712b detects the specific area of the mobile station 10 existing within the location detection target area.

The mobile station location information holding unit 712c holds location information indicating the specific area of the mobile station 10 within the location detection target area, detected by the mobile station location detection unit 712b.

The communication control unit 713 includes a for-application communication control unit 713a, a for-base-station communication control unit 713b, and a for-access-network-controller communication control unit 713c.

The for-application communication control unit 713a controls communication between a device executing processing according to application software and the mobile station location information management device 70. The application software is, for example, software providing information to the mobile station 10 existing in the specific area. The for-base-station communication control unit 713b controls communication between the base station 20 and the mobile station location information management device 70. The for-access-network-controller communication control unit 713c controls communication between the access network control unit 50 and the mobile station location information management device 70.

The control unit 720 controls the whole mobile station location information management device 70, and controls processing operations performed by the individual units 711 to 713 in the processing unit 710.

Individual units in the processing unit 710 other than the storage unit 711d and the control unit 720 may be implemented, for example, by a CPU. The storage unit 711d is, for example, a main storage device.

The transmission path interface 730 is an interface connecting to another device in the core network 40, such as an access network controller.

A location detection method for a mobile station according to an embodiment will be described that is performed by each device included in the wireless communication system 1. In addition, processing described later with reference to drawings is just an example, and may not be processed in a time-series manner, and a processing operation is included that may be executed in parallel or separately. In addition, the location detection processing for a mobile station according to the embodiment does not mean that it is difficult to add a processing operation other than the processing described later with reference to drawings.

The location detection processing for a mobile station according to the embodiment includes a processing operation that is preliminarily performed before connection is established between the mobile station 10 and the base station 20, and a processing operation that is performed after connection is established between the mobile station 10 and the base station 20.

First, the location detection processing for a mobile station according to an embodiment will be described that is preliminarily performed before connection is established between the mobile station 10 and the base station 20. As described later, the processing that is preliminarily performed before connection is established between the mobile station 10 and the base station 20 includes database creation processing.

Figure 6:
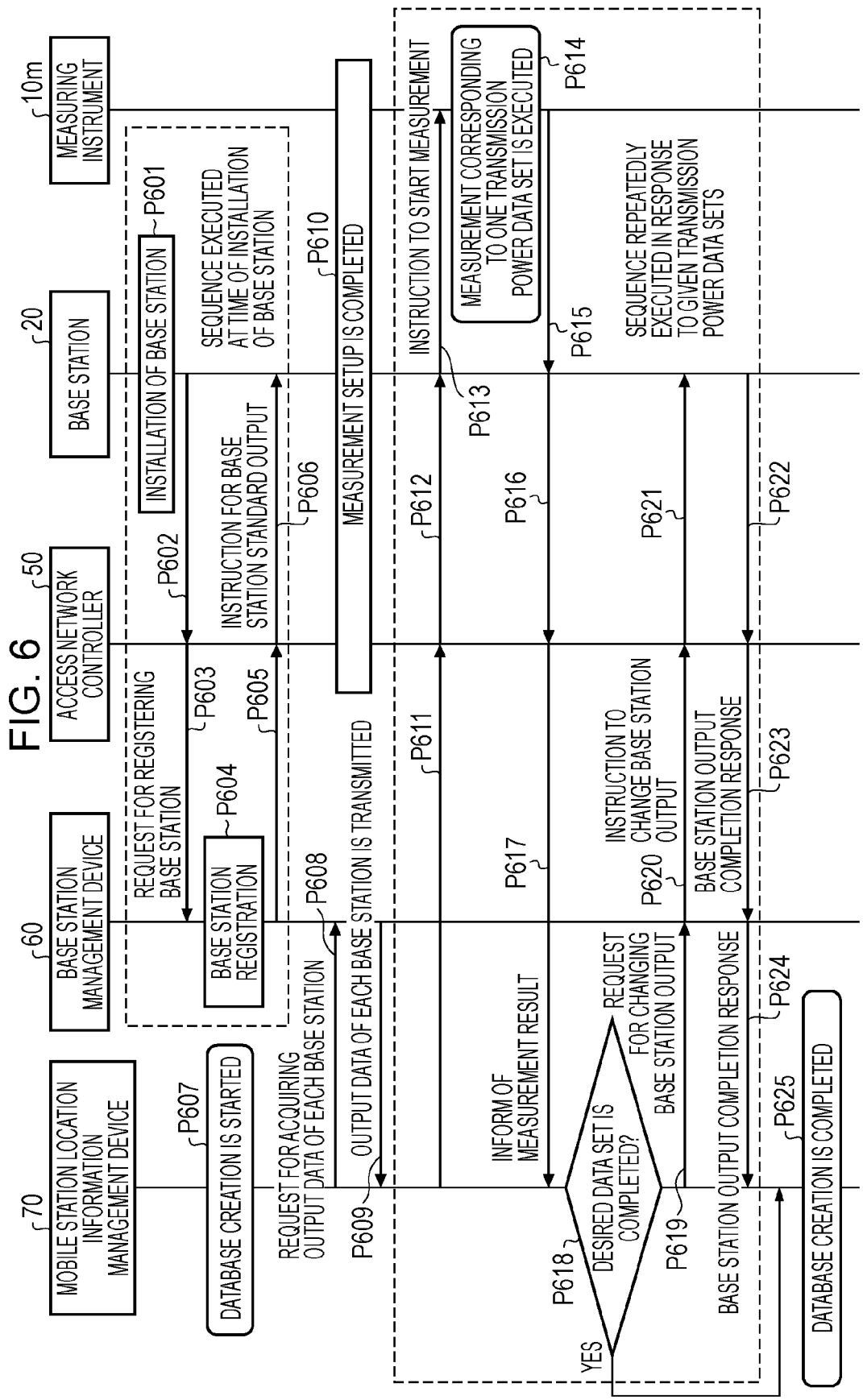
FIG. 6 is an exemplified diagram of a location detection processing sequence before connection of a mobile station, according to an embodiment.

FIG. 6 is an exemplified diagram of a location detection processing sequence before connection of a mobile station, according to an embodiment. As illustrated in FIG. 6, first, when the base station 20 has been installed in a predetermined location (P601), the base station 20 makes a request for registering the self-device 20, to the base station management device 60 (P603) through the access network controller 50 (P602). In the base station management device 60, owing to the base station registration and deletion unit 611a, the registration of the base station 20 is performed (P604). In addition, the base station wireless output control unit 611c notifies the base station 20 of a predetermined standard transmission power set by the wireless network optimization unit 612 and the setting-and-file management and software DL unit 616 (P606) through the access network controller 60 (P605). The base station 20 starts an operation utilizing the predetermined standard transmission power given notice of from the base station management device 60. The above-mentioned processing is performed for every installed base station 20.

When the processing performed for the base station 20 at the time of installation has been completed, the mobile station location information management device 70 starts creation processing for a database (P607). The database created by the mobile station location information management device 70 is a database used for the processing where the mobile station location detection unit 712b detects the specific area (specific location) of the mobile station 10 existing within the location detection target area.

Figure 7:
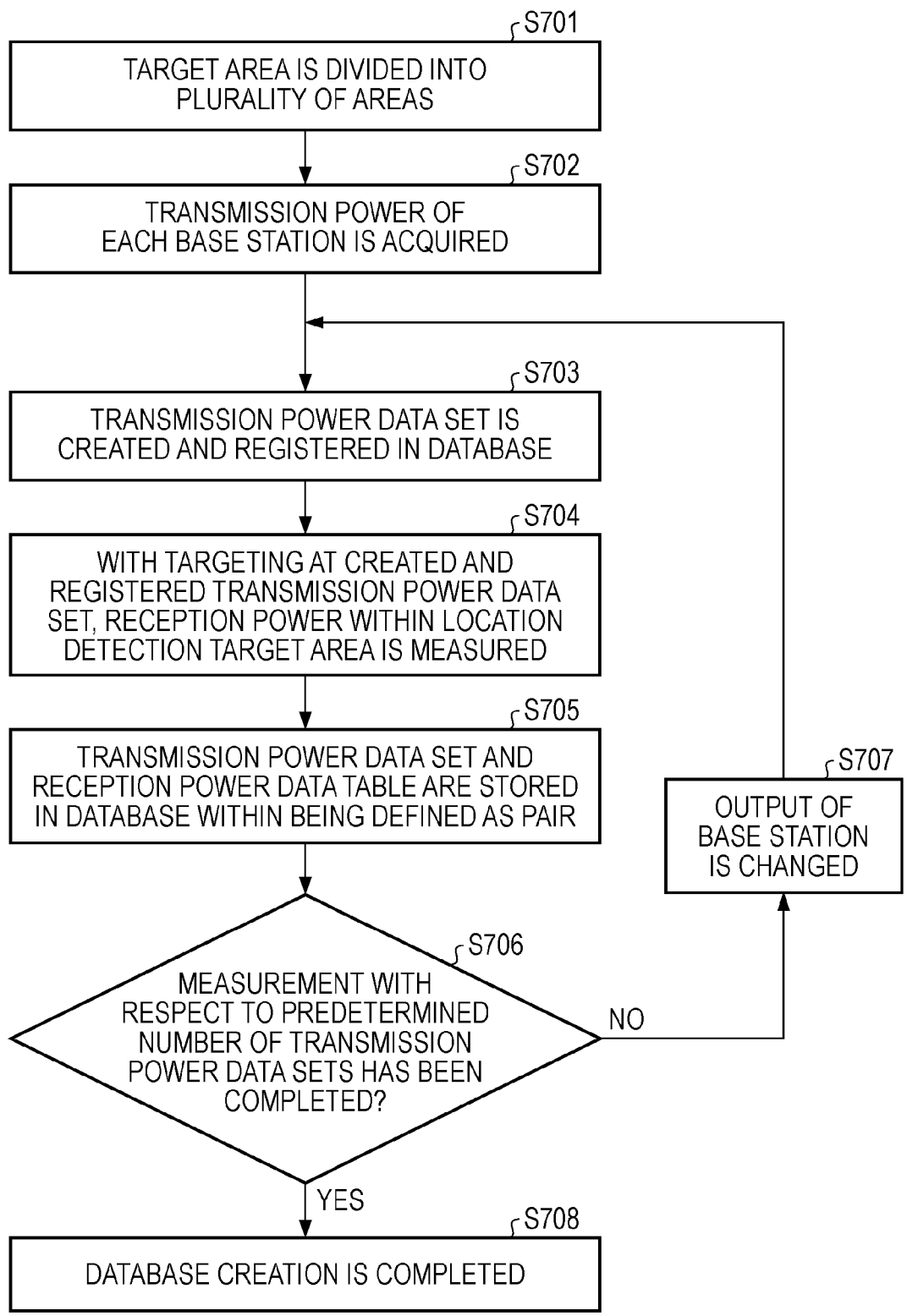
FIG. 7 is an exemplified diagram of a database creation processing flow, according to an embodiment.

FIG. 7 is an exemplified diagram of a database creation processing flow, according to an embodiment. In a step S701 illustrated in FIG. 7, the database creation unit 711a in the mobile station location information management device 70 divides a location detection target area into a plurality of areas (divided areas).

The location detection target area is, for example, a geographic area where provision of information due to application software is performed in response to a location in which the mobile station 10 connecting to the base station 20 exists. In addition, the location detection target area is a communication area covered by the base station 20 registered and managed owing to the same base station management device 60. When the base station management device 60 groups and manages the registered base stations 20, the location detection target area may be a communication area covered by the base station 20 of each group. In this case, a plurality of location detection target areas may exist within a communication area covered by all the base stations 20 registered in the same base station management device 60.

In addition, a method for dividing the location detection target area may be determined in accordance with an element such as the size of the location detection target area, the size of an area desired for the location detection of the mobile station 10, or a processing speed desired for location detection processing. Data relating to the determined division method may be preliminarily transmitted to the database creation unit 711a through the transmission path interface 730 or may be preliminarily recorded in a main storage device within the mobile station location information management device 70 and read by the database creation unit 711a.

In a step S702, the database creation unit 711a requests, from the base station management device 60, the transmission power data during operation of each base station 20 covering the communication of the location detection target area (P608). When, for example, transmission power has not been changed from the time of installation, the transmission power is the standard transmission power set at the time of installation. The base station management device 60 transmits, to the mobile station location information management device 70, the transmission power data during operation of each base station 20 covering the communication of the location detection target area (P609).

In a step S703, the database creation unit 711a creates a transmission power data set configured owing to the acquired transmission power data during operation of each base station 20. In addition, the database creation unit 711a records the created transmission power data set in a transmission power data set table within the storage unit 711. The transmission power data set table is a portion of the database of the embodiment.

In a step S704, with targeting at the transmission power data set created and recorded in the step S703, the reception power of a signal transmitted from each base station 20 is measured in each divided area within the location detection target area.

In other words, first, sessions are established among a measuring instrument 10m measuring the reception power, the base station 20, and the access network device 50, and a measurement setup made for the measuring instrument 10m to measure the reception power of a signal transmitted from each base station 20 is completed (P610). The measuring instrument 10m may be an arbitrary device having a function for measuring the reception power of a signal received from the base station, in the same way as the mobile station 10.

Through the access network controller 50 and the base station 20 (P611, P612), the database creation unit 711a instructs the measuring instrument 10m to measure the reception power of a wireless signal transmitted from each base station 20, in each divided area within the location detection target area (P613).

The measuring instrument 10m having the instruction from the database creation unit 711a measures the reception power of a wireless signal transmitted from each base station 20, in each divided area within the location detection target area (P614).

Figure 8:
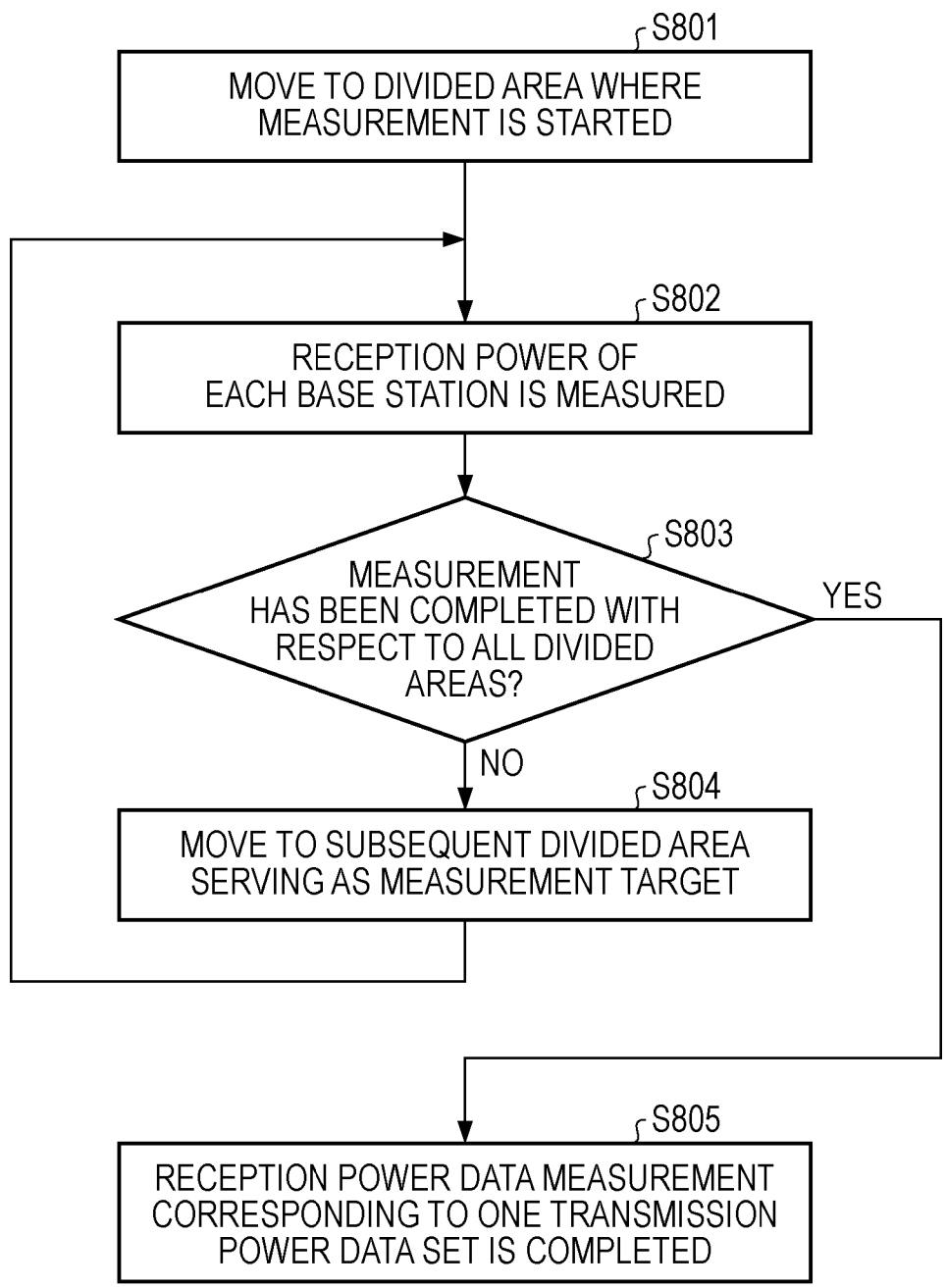
FIG. 8 is a diagram illustrating an example of a reception power data measurement processing flow, according to an embodiment.
Figure 9:
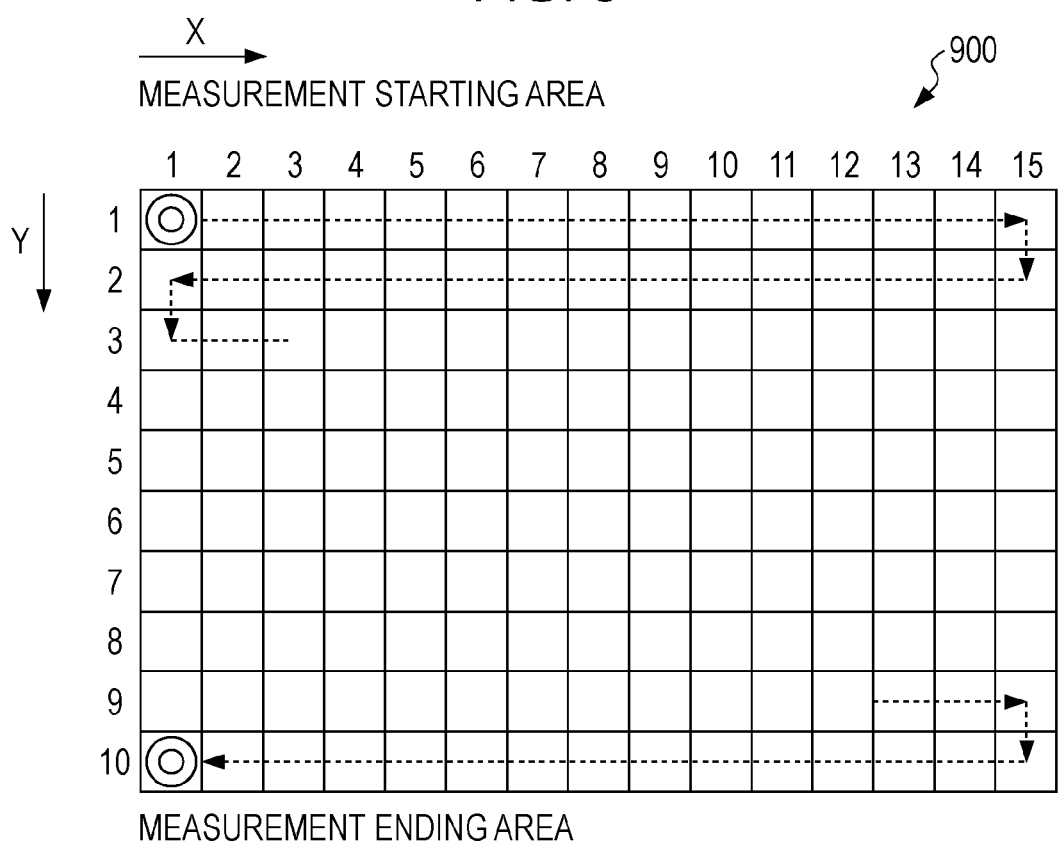
FIG. 9 is a schematic diagram illustrating an example of reception power data measurement processing, according to an embodiment.

FIG. 8 is an exemplified diagram of a reception power data measurement processing flow, according to an embodiment. FIG. 9 is the explanatory diagram of a reception power data measurement processing flow, according to an embodiment.

In a step S801, the measuring instrument 10m moves to a measurement start location within the location detection target area.

For example, a square-shaped location detection target area 900 is illustrated in FIG. 9, as an example. While not being illustrated in FIG. 9, within the location detection target area 900, the base station 20 exists that covers the communication of the location detection target area 900. When it is assumed that a horizontal direction in FIG. 9 is an X-axis, a vertical direction therein is a Y-axis, and the upper left of the drawing is the original point of the X-axis and the Y-axis, the square-shaped location detection target area 900 is divided into divided areas where the area number x of the X-axis ranges from 1 to 15 with the number of the area numbers x being 15 in total and the area number y of the Y-axis ranges from 1 to 10 with the number of the area numbers y being 10 in total, owing to the processing of the database creation unit 711a in the step S701. In the example of the location detection target area 900, the measuring instrument 10m moves to a divided area where both of the area numbers x and y are 1, as the measurement start location.

In a step S802, the measuring instrument 10m measures the reception power of a signal received from each base station 20, in the divided area where the self-device 10m exists.

In a step S803, the measuring instrument 10m determines whether or not the reception power has been measured with respect to all the divided areas of the location detection target area.

When it is determined that the reception power has not been measured with respect to an arbitrary divided area within the location detection target area yet (step S803: "NO"), the measuring instrument 10m moves to a divided area where measurement has not been performed, in a step S804. For example, in the location detection target area 900 illustrated in FIG. 9, with incrementing the value of the area number x of the X-axis by "1", the measuring instrument 10m moves to a divided area where the area number x is "2" and the area number y is "1". In addition, the reception power data measurement processing due to the measuring instrument 10m returns to the processing operation in the step S802.

Such processing operations in the step S802 and the step S803 are repeated until the reception power is measured with respect to all the divided areas within the location detection target area. In the location detection target area 900 illustrated in FIG. 9, the processing operations in the step S802 and the step S803 are repeated until reception power measurement in a divided area serving as a measurement ending location where the area number x is "1" and the area number y is "10" is completed.

When it is determined that the reception power has been measured with respect to all the divided areas within the location detection target area (step S803: "YES"), the processing proceeds to a step S805, and the measuring instrument 10m completes the reception power measurement within the location detection target area, targeted at the transmission power data set created and recorded in the step S703.

When the reception power measurement targeted at one transmission power data set has been completed, the measuring instrument 10m transmits the measured reception power measurement data to the database creation unit 711a (P617) through the base station 20 and the access network controller 50 (P615, P616).

In a step S705, the database creation unit 711a creates a reception power data table on the basis of the reception power measurement data received from the measuring instrument 10m. The reception power data table is a portion of the database of the embodiment along with the transmission power data set table.

The database creation unit 711a stores the created reception power data table and the transmission power data set considered as a measurement target in the database within the storage unit 711d with defining the created reception power data table and the transmission power data set as a searchable pair.

In a step S706, the database creation unit 711a determines whether or not the reception power measurement within the location detection target area has been completed with respect to a predetermined number of transmission power data sets (P618).

When the reception power measurement has not been completed with respect to a predetermined number of transmission power data sets (step S706: "NO"), in a step S707 the database creation unit 711a requests the base station management device 60 to change the transmission power of the base station 20 (P619). The base station management device 60 changes the transmission power of the base station 20, and issues an instruction to which changed transmission power data is attached, to the base station 20 to change transmission power (P621) through the access network controller 50 (P620). The base station 20 having received the instruction to change the transmission power changes the transmission power of the self-device 20 in accordance with the changed transmission power data attached to the instruction. When having completed the processing for changing the transmission power, the base station 20 sends a transmission power completion response to the base station management device 60 (P623) through the access network controller 50 (P622). The base station management device 60 sends a transmission power completion response of the base station 20, to which the changed transmission power data is attached, to the database creation unit 711a (P624).

When having received, from the base station management device 60, the transmission power completion response to which the changed transmission power data is attached, the database creation unit 711a returns to the processing in the step S703, and creates a new transmission power data set including the changed transmission power data of the base station 20. The database creation unit 711a records the created new transmission power data set in the transmission power data set table within the storage unit 711. In addition, the processing proceeds to the processing operation in the step S704, and processing is continued that is targeted at the created and recorded new transmission power data set.

When the reception power measurement has been completed with respect to a predetermined number of transmission power data sets (step S706: "YES"), the processing proceeds to a step S708, and the database creation unit 711a completes the processing for creating the database (P625).

As data used when the specific location of the mobile station 10 is detected, the data selection unit 711c selects and acquires, from the database, a reception power data table corresponding to the transmission power data set including the transmission power during operation of the base station 20. For example, when the transmission power has not been changed from the time of installation, the transmission power during operation of the base station 20 is the standard transmission power set at the time of installation.

FIG. 10 and FIG. 11 illustrate an example of the database created by the database creation unit 711a and stored in the storage unit 711d through such processing as described above. The database according to the embodiment includes a transmission power data set table and a reception power data table.

FIG. 10 is an exemplified diagram of the transmission power data set table, according to an embodiment. In FIG. 10, a transmission power data set table is illustrated that is created and recorded by changing the transmission power of each of the base stations 20 whose number is k with the base station numbers thereof ranging from 1 to k (the k is an integer number more than 1).

As illustrated in FIG. 10, in each row of the transmission power data set table, a transmission power data set including the transmission power data of the base stations 20 whose number is k is recorded. The recorded transmission power data of each base station 20 is, for example, an attenuation amount (dB) with respect to the maximum transmission power of each base station 20, as illustrated in FIG. 10.

In addition, as illustrated in FIG. 10, in each row of the transmission power data set table, a reception power data table number corresponding to each transmission power data set is recorded. The reception power data table number is recorded with respect to each transmission power data set, and hence, it may become possible to search the reception power data table corresponding to each transmission power data set.

FIG. 11 is an exemplified diagram of a reception power data table, according to an embodiment. In FIG. 11, a reception power data table corresponding to each transmission power data set illustrated in FIG. 10 is illustrated.

In FIG. 11, a reception power data table corresponding to a reception power data table number 101 illustrated in FIG. 10 is illustrated in detail, as an example. In FIG. 11, while reception power data tables corresponding to the other reception power data table numbers are omitted, the reception power data tables have the same format as the reception power data table 101.

In the reception power data table, for example, with respect to each divided area within the location detection target area 900 illustrated in FIG. 9, the reception power data of a signal received from each of the base stations 20 whose number is k is recorded. The recorded reception power data is, for example, an attenuation amount (dB) with respect to the transmission power of each base station 20, as illustrated in FIG. 11.

In an example of the reception power data table illustrated in FIG. 11, column numbers c ranging from 1 to 15 correspond to the area numbers x ranging from 1 to 15 within the location detection target area 90, respectively, and row numbers r ranging from 1 to 10 correspond to the area numbers y ranging from 1 to 10, respectively. In addition, in an example of the reception power data table illustrated in FIG. 11, each piece of divided area data specified by the column number c and the row number r includes reception power data with respect to each base station 20 in a divided area where the area number x thereof is equal to the column number c and the area number y thereof is equal to the row number r.

Next, location detection processing for a mobile station according to an embodiment will be described that is performed after connection has been established between the mobile station 10 and the base station 20. As described below, the location detection processing performed after connection has been established between the mobile station 10 and the base station 20 includes mobile station location registration processing, database selection processing, and specific area detection processing.

First Embodiment

Figure 12:
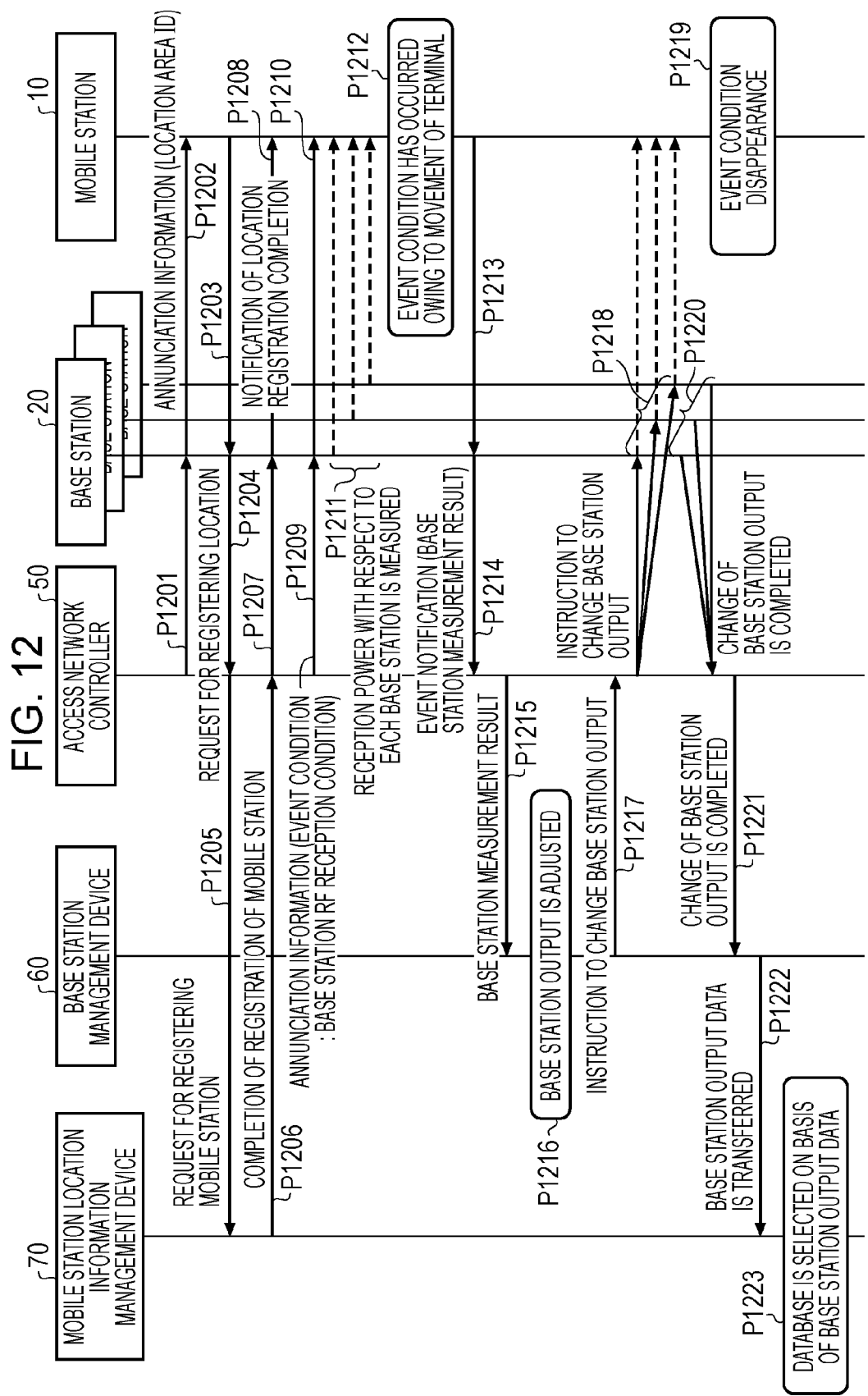
FIG. 12 is an exemplified diagram of a location detection processing sequence after connection of a mobile station, according to an embodiment.

FIG. 12 is an exemplified diagram of a location detection processing sequence after connection of a mobile station, according to an embodiment. FIG. 12 illustrates the sequence of the location detection processing after connection of a mobile station, which includes the mobile station location registration processing and the database selection processing.

When having entered a location detection target area covered by the base station 20, the mobile station 10 receives annunciation information transmitted from the base station 20 (P1202) through the access network controller 50 (P1201). The annunciation information includes a location area identifier (identification data: ID) indicating the location detection target area, and it may be possible for the mobile station 10 to determine that the self-device 10 exists within the location detection target area indicated by the location area identifier.

The mobile station 10 makes a request for registering location information indicating that the self-device 10 exists within the location detection target area indicated by the location area identifier, to the access network controller 50 (P1204) through the base station 20 (P1203). In addition, the access network controller 50 requests the mobile station location information registration and deletion unit 712a to register the location information of the mobile station 10 (P1205).

When having registered the location information of the mobile station 10, the mobile station location information registration and deletion unit 712a notifies the access network controller 50 of the completion of the registration of the location information of the mobile station 10 (P1206). The access network controller 50 notifies the mobile station 10 of the completion of the registration of the location information (P1208) through the base station 20 (P1207).

The access network controller 50 transmits annunciation information including an event condition to the mobile station (P1210) through the base station 20 (P1209). The event condition is, for example, a condition that the reception power level of a control channel received from each base station 20 changes with a predetermined level.

The mobile station 10 measures the reception power of the control channel transmitted from each base station 20 at a predetermined time interval (P1211).

For example, the mobile station 10 determines that the reception power level of the control channel received from each base station 20 has changed with a predetermined level owing to the movement of the self-device 10 and hence the event condition has occurred (P1212). The mobile station 10 sends a notice of the occurrence of an event to the access network controller 50 (P1214) through the base station 20 (P1213), measured reception power data with respect to each base station 20 being attached to the notice. The access network controller 50 transmits the reception power data with respect to each base station 20 to the base station management device 60 (P1215).

On the basis of the received reception power data with respect to each base station 20, the wireless network optimization unit 612 in the base station management device 60 adjusts the transmission power of each base station 20 (P1216). The wireless network optimization unit 612 issues an instruction to which the adjusted transmission power data of each base station 20 is attached, to the access network controller 50 to change the transmission power of each base station 20 (P1217). The access network controller 50 issues an instruction to which the adjusted transmission power data is attached, to each base station 20 to change the transmission power thereof (P1218).

Each base station 20 changes the transmission power thereof in accordance with the adjusted transmission power data attached to the transmission power change instruction from the access network controller 50. The mobile station 10 measures the reception power of the control channel from each base station 20 whose transmission power has been changed, and determines that the event occurring in the process P1212 has disappeared (P1219).

Each base station 20 notifies the access network controller 50 of the completion of the change of the transmission power (P1220). The access network controller 50 notifies the base station management device 60 of the completion of the change of the transmission power of each base station 20 (P1221). The base station management device 60 transmits the changed transmission power data of each base station 20 to the mobile station location information management device 70.

When such transmission power change processing as described above has been performed, the mobile station location information management device 70 selects (selects again) data within the database, used for detecting the specific area of the mobile station 10 existing within the location detection target area, in accordance with the changed transmission power of each base station 20 (P1223).

Figure 13:
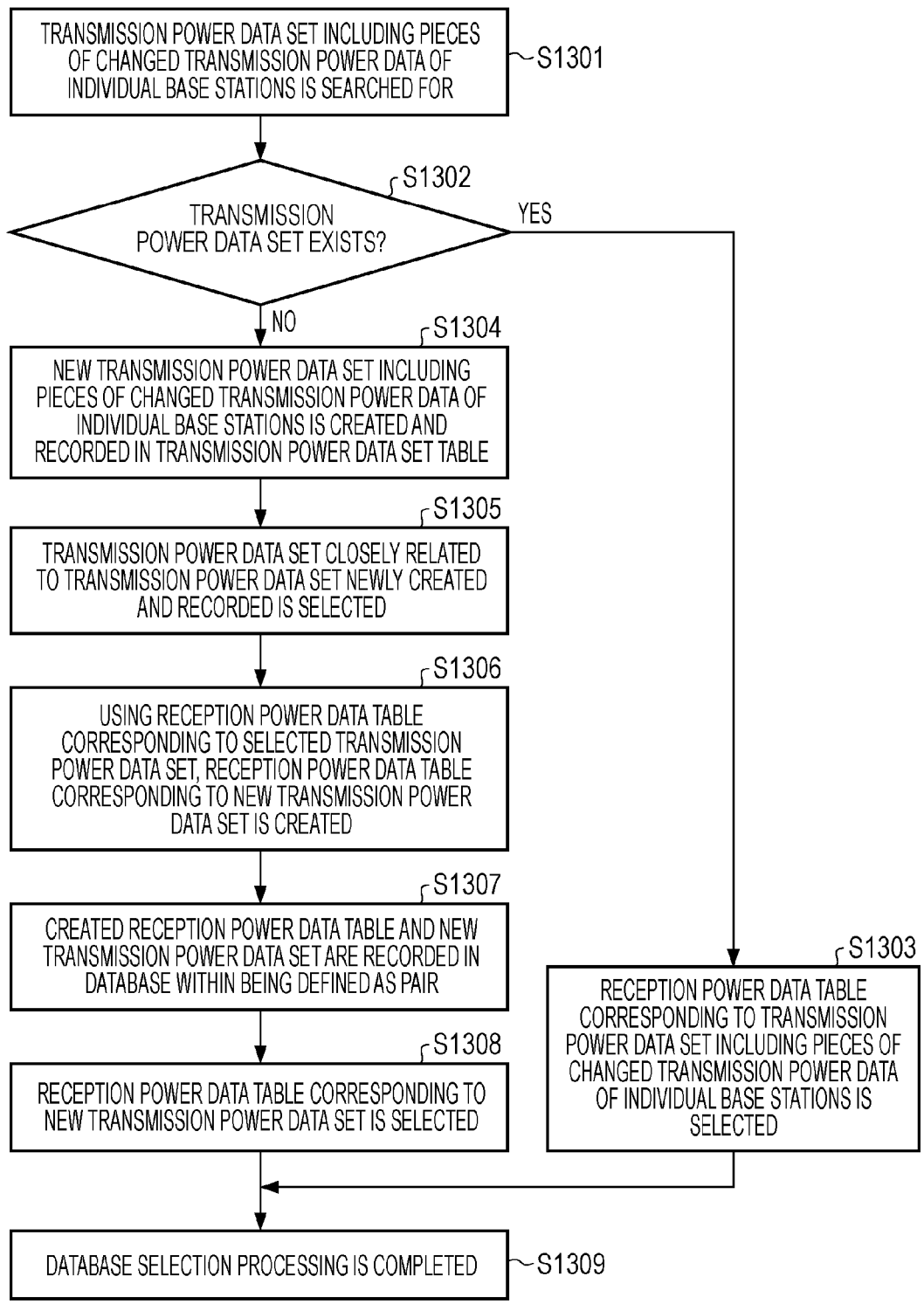
FIG. 13 is an exemplified diagram of a database selection processing flow, according to a first embodiment.

FIG. 13 is an exemplified diagram of a database selection processing flow, according to a first embodiment. The database selection processing according to the first embodiment illustrated in FIG. 13 is executed every time the transmission power of each base station 20 is adjusted by the wireless network optimization unit 612.

In a step S1301, the data search unit 711b searches the transmission power data set table already recorded in the storage unit 711d for a transmission power data set including the pieces of the changed transmission power data of the individual base stations 20. In other words, the data search unit 711b searches the transmission power data set table for the same transmission power data set as the combination of the pieces of the changed transmission power data of the individual base stations 20.

When, as a result of the search due to the data search unit 711b, a transmission power data set, which includes the pieces of the changed transmission power data of the individual base stations 20, exists within the transmission power data set table (step S1302: "YES"), the processing proceeds to a step S1303.

In the step S1303, as data used for the specific area detection processing for the mobile station 10, the data selection unit 711c selects a reception power data table corresponding to the transmission power data set including the pieces of the changed transmission power data of the individual base stations 20.

On the other hand, when, as a result of the search due to the data search unit 711b, a transmission power data set, which includes the pieces of the changed transmission power data of the individual base stations 20, does not exist within the transmission power data set table (step S1302: "NO"), the processing proceeds to a step S1304.

In the step S1304, the database creation unit 711a creates a new transmission power data set including the pieces of the changed transmission power data of the individual base stations 20. In addition, the database creation unit 711a records the newly created transmission power data set in the transmission power data set table.

In a step S1305, within the transmission power data set table, the data search unit 711b searches for and selects a transmission power data set closely related to the newly created and recorded transmission power data set.

In a step S1306, using a reception power data table corresponding to the transmission power data set selected in the step S1305, the database creation unit 711a creates a reception power data table corresponding to the newly created and recorded transmission power data set.

In a step S1307, the database creation unit 711a records the transmission power data set, newly created and recorded in the step S1303, and the reception power data table created in the step S1306 in the database within the storage unit 711d with defining the transmission power data set and the reception power data table as a searchable pair.

In a step S1308, the data selection unit 711c selects the reception power data table created in the step S1306, as data used for the specific area detection processing for the mobile station 10.

When the processing operations in the step S1301 to the step S1308 have been completed, the sequence of database selection processing operations is completed (S1309).

Examples of the processing operations in the step S1305 and the step S1306 will be described.

First, in the step S1305, within the transmission power data set table, the data search unit 711b searches for and selects, for example, two adjacent transmission power data sets having values close to the transmission power data set including the pieces of the changed transmission power data of the individual base stations 20.

For example, it is assumed that the pieces of the changed transmission power data of the individual base stations 20 whose number is k, which are included in the transmission power data set newly created and recorded in the step S1304, are $CP_1, CP_2, \ldots,$ and $CP_k$. In addition, it is assumed that the pieces of the transmission power data of the individual base stations 20 whose number is k, which are included in an arbitrary transmission power data set having already been recorded within the transmission power data set table before the start of this database selection processing, are $DP_1, DP_2, \ldots,$ and $DP_k$. With targeting at all the transmission power data sets having already been recorded within the transmission power data set table before the start of this database selection processing, the data search unit 711b calculates, using Expression (1), a data-to-data distance L between the pieces of the changed transmission power data of the individual base stations 20 whose number is k and the pieces of the transmission power data of the individual base stations 20 whose number is k and which are within an arbitrary transmission power data set.

$$L = \sqrt{(DP_1-CP_1)^2 + (DP_2-CP_2)^2 + \ldots + (DP_k-CP_k)^2}$$ (Expression 1)

Within all the transmission power data sets having already been recorded within the transmission power data set table before the start of this database selection processing, first the data search unit 711b searches for and selects a transmission power data set where the calculated data-to-data distance L is a minimum value. It is assumed that the selected transmission power data set is referred to as a first transmission power data set for convenience. When it is assumed that the pieces of the transmission power data of the individual base stations 20 whose number is k and which are within the selected first transmission power data set are $Pa_1, Pa_2, \ldots,$ and $Pa_k$, the above-mentioned Expression (1) is expressed as the following Expression (2).

$$L_1 = \sqrt{(Pa_1-CP_1)^2 + (Pa_2-CP_2)^2 + \ldots + (Pa_k-CP_k)^2}$$ (Expression 2)

The $L_1$ expressed by Expression (2) is a data-to-data distance between the first transmission power data set and the transmission power data set including the pieces of the changed transmission power data of the base stations 20.

From among individual terms $(Pa_1-CP_1), (Pa_2-CP_2), \ldots,$ and $(Pa_k-CP_k)$ before squaring, included in the right-hand side of the data-to-data distance L1 expressed by Expression (2), the data search unit 711b detects a term other than zero.

Within the transmission power data set table, the data search unit 711b searches for a transmission power data set where the plus sign or minus sign of a term corresponding to the detected term is opposite to the sign of the detected term or the value of a term corresponding to the detected term is zero. For example, if it is assumed that the individual pieces of the transmission power data in the transmission power data set serving as a search target are $Ps_1, Ps_2, \ldots,$ and $Ps_k$, when the $(Pa_1-CP_1)$ has a minus sign, the data search unit 711b searches for a transmission power data set where corresponding $(Ps_1-CP_1)$ has a plus sign or the corresponding $(Ps_1-CP_1)$ is zero.

With targeting all the searched transmission power data sets, the data search unit 711b calculates the data-to-data distance L, using the above-mentioned Expression (1). In addition, from among all the searched transmission power data sets, the database creation unit 711a selects a transmission power data set where the calculated data-to-data distance L is a minimum value. It is assumed that the selected transmission power data set is referred to as a second transmission power data set for convenience.

When it is assumed that the pieces of the transmission power data of the individual base stations 20 whose number is k and which are within the selected second transmission power data set are $Pb_1, Pb_2, \ldots,$ and $Pb_k$, the relationship of the following Expression (3) or Expression (4) is satisfied among $CP_\alpha, Pa_\alpha,$ and $Pb_\alpha$ (the $\alpha$ is an integer number ranging from 1 to k).

$$Pa_\alpha \leq CP_\alpha \leq Pb_\alpha \quad \text{(Expression 3)}$$

$$Pb_\alpha \leq CP_\alpha \leq Pa_\alpha \quad \text{(Expression 3)}$$

As is clear from Expression (3) and Expression (4), the values of the pieces of the changed transmission power data of the individual base stations 20 range between the values of the pieces of the transmission power data of the individual base stations 20 included in the first and second transmission power data sets.

In this way, owing to the processing operation in the step S1305 described above as an example, from within the transmission power data set table, it may be possible to select two adjacent transmission power data sets having values close to the transmission power data set including the pieces of the changed transmission power data of the base stations 20.

Next, in the step S1306, using reception power data tables corresponding to the first and second transmission power data sets having already been selected, the database creation unit 711a creates a reception power data table corresponding to the transmission power data set, created and recorded in the step S1304. For example, the database creation unit 711a creates a reception power data table by performing the following processing.

It is assumed that the pieces of the reception power data of the individual base stations 20, included in divided area data which exists within the reception power data table corresponding to the first transmission power data set and where the area number x of the location detection target area is m and the area number y thereof is n, are $Pa_{mn1}, Pa_{mn2}, \ldots,$ and $Pa_{mnk}$ (the m and the n are arbitrary integer numbers greater than or equal to 1). In the reception power data table example illustrated in FIG. 11, the divided area data where the area number x of the X-axis of the location detection target area is m and the area number y of the Y-axis thereof is n exists in a location, whose column number l is m and whose row number r is n, within the reception power data table. In the same way, it is assumed that the pieces of the reception power data of the individual base stations 20, included in divided area data which exists within the reception power data table corresponding to the second transmission power data set and where the area number x is m and the area number y is n, are $Pb_{mn1}, Pb_{mn2}, \ldots,$ and $Pb_{mnk}$.

Using the following Expression (5) to Expression (9), the database creation unit 711a calculates and acquires the value of each of the pieces of the reception power data $CP_{mn1}, CP_{mn2}, \ldots,$ and $CP_{mnk}$ of the individual base stations 20 included in the divided area data which exists within the reception power data table corresponding to the transmission power data set including the pieces of the changed transmission power data of the base stations 20 and where the area number x is m and the area number y is n, the number of the base stations 20 being k.

In other words, when $Pa_\alpha = CP_\alpha$ and $CP_\alpha \neq Pb_\alpha$ are satisfied (the $\alpha$ is an integer number ranging from 1 to k), the database creation unit 711a acquires $CP_{mn\alpha}$ on the basis of the following Expression (5).

$$CP_{mn\alpha} = Pa_{mn\alpha} \quad \text{(Expression 5)}$$

When $Pb_\alpha = CP_\alpha$ and $CP_\alpha \neq P_\alpha$ are satisfied, the database creation unit 711a acquires the $CP_{mn\alpha}$ on the basis of the following Expression (6).

$$CP_{mn\alpha} = Pb_{mn\alpha} \quad \text{(Expression 6)}$$

When $Pa_\alpha = Pb_\alpha = CP_\alpha$ and $Pa_{mn\alpha} \neq Pb_{mn\alpha}$ are satisfied, the database creation unit 711a calculates and acquires the $CP_{mn\alpha}$ on the basis of the following Expression (7).

$$CP_{mn\alpha} = \frac{Pa_{mn\alpha} + Pb_{mn\alpha}}{2} \quad \text{(Expression 7)}$$

When $Pa_\alpha < CP_\alpha < Pb_\alpha$ is satisfied, the database creation unit 711a calculates and acquires the $CP_{mn\alpha}$ on the basis of the following Expression (8).

$$CP_{mn\alpha} = \frac{(Pb_\alpha - CP_\alpha) \times Pa_{mn\alpha} + (CP_\alpha - Pa_\alpha) \times Pb_{mn\alpha}}{Pb_\alpha - Pa_\alpha} \quad \text{(Expression 8)}$$

When $Pb_\alpha < CP_\alpha < Pa_\alpha$ is satisfied, the database creation unit 711a calculates and acquires the $CP_{mn\alpha}$ on the basis of the following Expression (9).

$$CP_{mn\alpha} = \frac{(Pa_\alpha - CP_\alpha) \times Pb_{mn\alpha} + (CP_\alpha - Pb_\alpha) \times Pa_{mn\alpha}}{Pa_\alpha - Pb_\alpha} \quad \text{(Expression 9)}$$

In this way, owing to the processing operation in the step S1306 described above as an example, using the reception power data table corresponding to the transmission power data set selected in the step S1305, it may be possible to create a reception power data table corresponding to the transmission power data set created and recorded in the step S1304.

In addition, in the above-mentioned example, as illustrated in Expression (3) and Expression (4), the data search unit 711b selects two transmission power data sets whose values are most and second-most closely related to the changed transmission power data set of the individual base stations 20 and where the pieces of the changed transmission power data of the individual base stations 20 have intermediate values. In addition, as illustrated in Expression (7) to Expression (9), by performing weighted averaging on the pieces of the reception power data with respect to the individual base stations 20, included in the divided area data, between reception power tables individually corresponding to the two selected transmission power data sets, the database creation unit 711a creates the reception power data table corresponding to the changed transmission power data set of the individual base stations 20.

However, the processing operations in the step S1305 and the step S1306 are not limited to the above-mentioned example.

For example, the data search unit 711b may also select two transmission power data sets which have values larger than the pieces of the changed transmission power data of the individual base stations 20 and whose values are most and second-most closely related to the changed transmission power data set of the individual base stations 20. In addition, the database creation unit 711a compares the reception power tables individually corresponding to the two selected transmission power data sets, and individually calculates increases in the pieces of the reception power data with respect to the individual base stations 20, the pieces of the reception power data being included in the divided area data. Then, the database creation unit 711a may create the reception power data table corresponding to the changed transmission power data set of the individual base stations 20, by individually subtracting the calculated increases from the pieces of the reception power data included in divided area data within the reception power table corresponding to the transmission power data set whose values are most closely related.

In addition, the data search unit 711b may also select two transmission power data sets which have values smaller than the pieces of the changed transmission power data of the individual base stations 20 and whose values are most and second-most closely related to the changed transmission power data set of the individual base stations 20. In addition, the database creation unit 711a compares the reception power tables individually corresponding to the two selected transmission power data sets, and individually calculates decreases in the pieces of reception power data with respect to the individual base stations 20, the pieces of reception power data being included in the divided area data. Then, the database creation unit 711a may create the reception power data table corresponding to the changed transmission power data set of the individual base stations 20, by individually adding the calculated decreases to the pieces of the reception power data included in divided area data within the reception power table corresponding to the transmission power data set whose values are most closely related.

As described above, in the mobile communication system where the transmission power of the base station is adjusted, the database used for detecting the specific area of the mobile station is selected or created in accordance with the adjusted transmission power of the base station.

Therefore, according to the embodiment, even if the transmission power of the base station is changed, it may be possible to accurately the location of the mobile station 10.

In addition, in the embodiment, in accordance with the transmission power of the base station, adjusted during operation, the database used for detecting the location of the mobile station is created.

Therefore, according to the embodiment, it may be possible to create the database according to the operational results of the base station, and a huge database may not be preliminarily prepared that is intended for all changes in the transmission power. In addition, using the database according to the operational results of the base station, it may be possible to swiftly and effectively execute the detection of the specific location of the mobile station.

After the mobile station location registration processing or after the mobile station location registration processing and the database selection processing, described above with reference to FIG. 12 and FIG. 13, a device, which complies with application software providing information using the location information of the mobile station 10, requests the location information of the mobile station 10 from the mobile station location information management device 70. In accordance with the location information request, the mobile station location information management device 70 detects the specific area of the mobile station 10 existing within the location detection target area, and informs the device, which complies with the application software, of the detected specific area.

Figure 14:
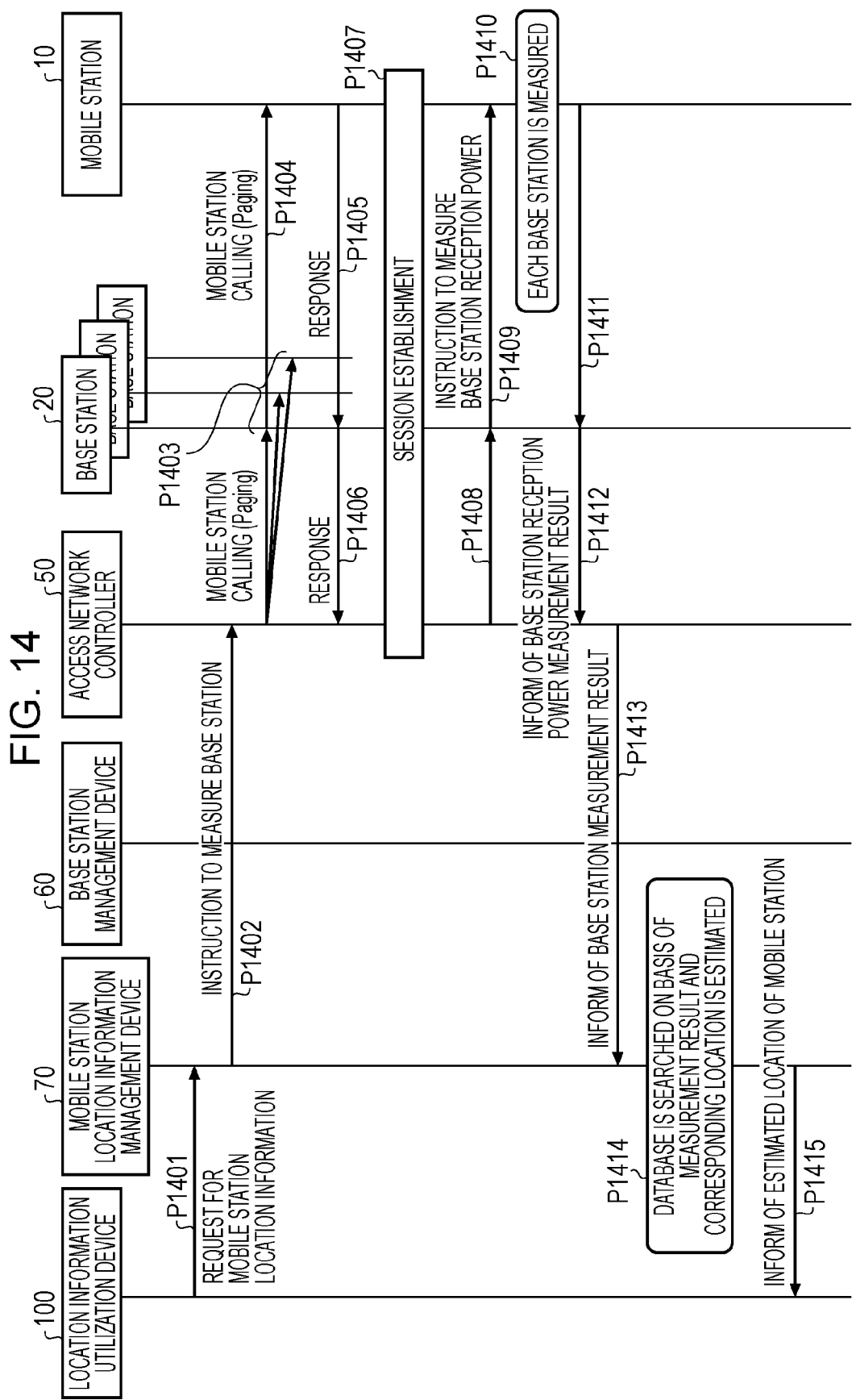
FIG. 14 is an exemplified diagram of a specific area detection processing sequence, according to an embodiment.
Figure 15:
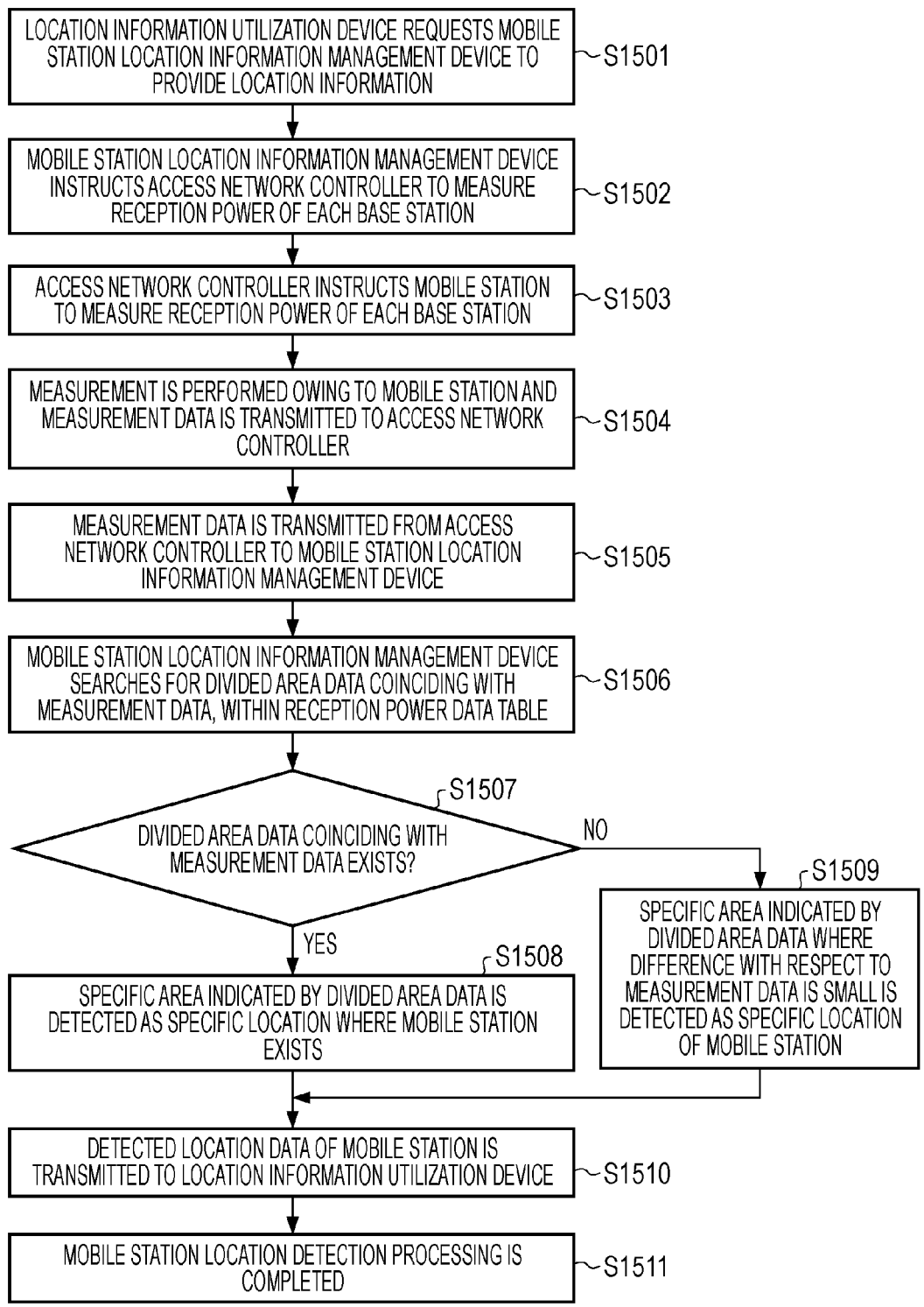
FIG. 15 is an exemplified diagram of a specific area detection processing flow, according to a first embodiment.

FIG. 14 is an exemplified diagram of a specific area detection processing sequence, according to an embodiment. FIG. 15 is an exemplified diagram of a specific area detection processing flow, according to a first embodiment.

In a step S1501, a location information utilization device 100 requests the mobile station location information management device 70 to provide location information indicating a specific area within which the mobile station 10 exists (P1401). The location information utilization device 100 is, for example, an external device that complies with such application software as described above providing information to the mobile station 10 existing within the specific area.

Owing to the mobile station location registration processing described above with reference to FIG. 12, it may be possible for the mobile station location information management device 70 to determine that the mobile station 10 exists within the location detection target area. Therefore, in a step S1502, the mobile station location information management device 70 instructs the access network controller 50 to measure, in a location where the mobile station 10 exists, the reception power of a signal transmitted from each base station 20 (P1402).

It may be difficult for the access network controller 50 to determine in which location within the location detection target area the mobile station 10 exists and determine to which base station 20 the mobile station 10 may connect. Therefore, when having received the instruction from the mobile station location information management device 70, the access network controller 50 requests each base station 20 covering communication within the location detection target area to call the mobile station 10 (paging) (P1403).

When having received the call request from the access network controller 50, each base station 20 calls the mobile station 10 (P1404). When having received the call from the base station 20, the mobile station 10 sends a response corresponding to the call to a specific base station 20 having a cell 20c where the self-device 10 exists (P1405). The specific base station 20 having received the response from the mobile station 10 sends a response corresponding to the call to the access network controller 50 (P1406). In addition, sessions are established between the mobile station 10, the specific base station 20 having sent the call response, and the access network controller 50 (P1407).

After the session establishment in the process P1407, in a step S1503, the access network controller 50 instructs, through the specific base station 20 (P1408), the mobile station 10 to measure the reception power of a signal transmitted from each base station 20 covering communication within the location detection target area (P1409).

In a step S1504, the mobile station 10 measures, in a location where the self-device 10 exists, the reception power of the signal transmitted from each base station 20 covering the communication within the location detection target area. In addition, the mobile station 10 transmits, through the specific base station 20 where a session has been established (P1411), a reception power data set including the measurement data of the measured reception power with respect to each base station 20, to the access network controller 50 (P1412).

In a step S1505, the access network controller 50 transmits, to the mobile station location information management device 70, the reception power data set received from the mobile station 10 (P1413).

Within the reception power data table already selected by the data selection unit 711c, the mobile station location information management device 70 searches for divided area data having values equal or closely related to the pieces of the reception power data of the individual base stations 20, included in the reception power data set, and detects the location of the mobile station 10 (P1414). The detail of the processing operation in the process P1414 is, for example, as the following step S1506 to step S1509.

In the step S1506, the mobile station location detection unit 712b compares the pieces of the reception power data of the individual base stations 20, included in the reception power data set, with the pieces of the reception power data of the individual base stations 20, included in each piece of divided area data within the reception power data table already selected by the data selection unit 711c. In addition, within the reception power data table already selected by the data selection unit 711c, the mobile station location detection unit 712b searches for divided area data coinciding with the reception power data set.

In the step S1507, the mobile station location detection unit 712b determines whether or not divided area data coinciding with the reception power data set exists within the reception power data table already selected by the data selection unit 711c.

When the divided area data coinciding with the reception power data set exists (step S1507: "YES"), the processing proceeds to the step S1508.

In the step S1508, the mobile station location detection unit 712b determines, as a specific location where the mobile station 10 exists, a specific area indicated by the divided area data coinciding with the reception power data set, and hence, detects the specific location of the mobile station 10. For example, when the area number x and the area number y, indicated by the divided area data coinciding with the reception power data set, are 3 and 4, respectively, the mobile station location detection unit 712b determines that the mobile station 10 exists in a divided area within the location detection target area where the area number x is 3 and the area number y is 4, and hence, detects the specific location of the mobile station 10.

When divided area data coinciding with the reception power data set does not exist (step S1507: "NO"), the processing proceeds to the step S1509.

In the step S1509, within the reception power data table already selected by the data selection unit 711c, the mobile station location detection unit 712b determines, as a specific area where the mobile station 10 exists, divided area data where a difference with respect to the reception power data set is small, and hence, detects the location of the mobile station 10. For example, the mobile station location detection unit 712b performs the detection in accordance with the following processing.

It is assumed that the pieces of the reception power data with respect to the individual base stations 20, included in the reception power data set, are $RP_1$, $RP_2$, ..., and $RP_k$. In addition, it is assumed that the pieces of the reception power data with respect to the individual base stations 20, included in divided area data that exists within the reception power data table already selected by the data selection unit 711c and where the area number x is m and the area number y is n, are $Pc_{mn1}$, $Pc_{mn2}$, ..., and $Pc_{mnk}$ (the m and the n are arbitrary integer numbers greater than or equal to 1). With targeting at all the pieces of the divided area data existing within the reception power data table already selected by the data selection unit 711c, the mobile station location detection unit 712b calculates a data difference $D_{mn}$ between the reception power data set and the specific area data where the area number x is m and the area number y is n, using the following Expression (10).

$$D_{mn} = \frac{}{\sqrt{(RP_1 - Pc_{mn1})^2 + (RP_2 - Pc_{mn2})^2 + ... + (RP_k - Pc_{mnk})^2}} \quad \text{(Expression 10)}$$

The mobile station location detection unit 712b acquires a data difference $D_{ij}$ whose value is the smallest among the calculated data differences $D_{mn}$ (the i and the j are integer numbers greater than or equal to 1). The mobile station location detection unit 712b determines that a divided area where the area number x is i and the area number y is j, indicated by divided area data corresponding to the data difference $D_{ij}$, is the specific area where the mobile station 10 exists, and hence, detects the specific location of the mobile station 10.

In a step S1510, the mobile station location detection unit 712b transmits, to the location information utilization device 100, location information indicating the specific location of the mobile station 10, detected in the step S1508 or the step S1509 (P1415).

In addition, the mobile station location detection unit 712b causes the mobile station location information holding unit 712c to hold the location information. The location information held in the mobile station location information holding unit 712c may be used for, for example, the following processing. In other words, when, in the step S1509, a plurality of pieces of difference data $D_{mn}$ whose values are the smallest exist, the mobile station location detection unit 712b determines, as the specific area where the mobile station 10 exists, a divided area close to the location information already held in the mobile station location information holding unit 712c, from among divided areas corresponding to these plural pieces of the difference data $D_{mn}$.

When the processing operations in the step S1501 to the step S1510 have been completed, the processing proceeds to a step S1511, and the sequence of specific area detection processing operations is completed.

As described above, in the mobile communication system where the transmission power of the base station is adjusted, the mobile station location information management device detects the specific location of the mobile station 10 existing within the location detection target area, using data within the database, selected or created in accordance with the adjusted transmission power of the base station. Therefore, according to the embodiment, even if the transmission power of the base station is changed, it may be possible to accurately the location of the mobile station 10.

Second Embodiment

In the first embodiment, owing to the database selection processing, one reception power data table may be selected and acquired that corresponds to the transmission power of the base station 20 during operation. In addition, using the one selected and acquired reception power data table, the specific area detection processing is performed.

In a second embodiment, owing to database selection processing, a plurality of reception power data tables are selected and acquired that correspond to the transmission power of the base station 20 during operation. In addition, using the plural selected and acquired reception power data tables, specific area detection processing is performed.

First, the database selection processing according to the second embodiment will be described.

Figure 16:
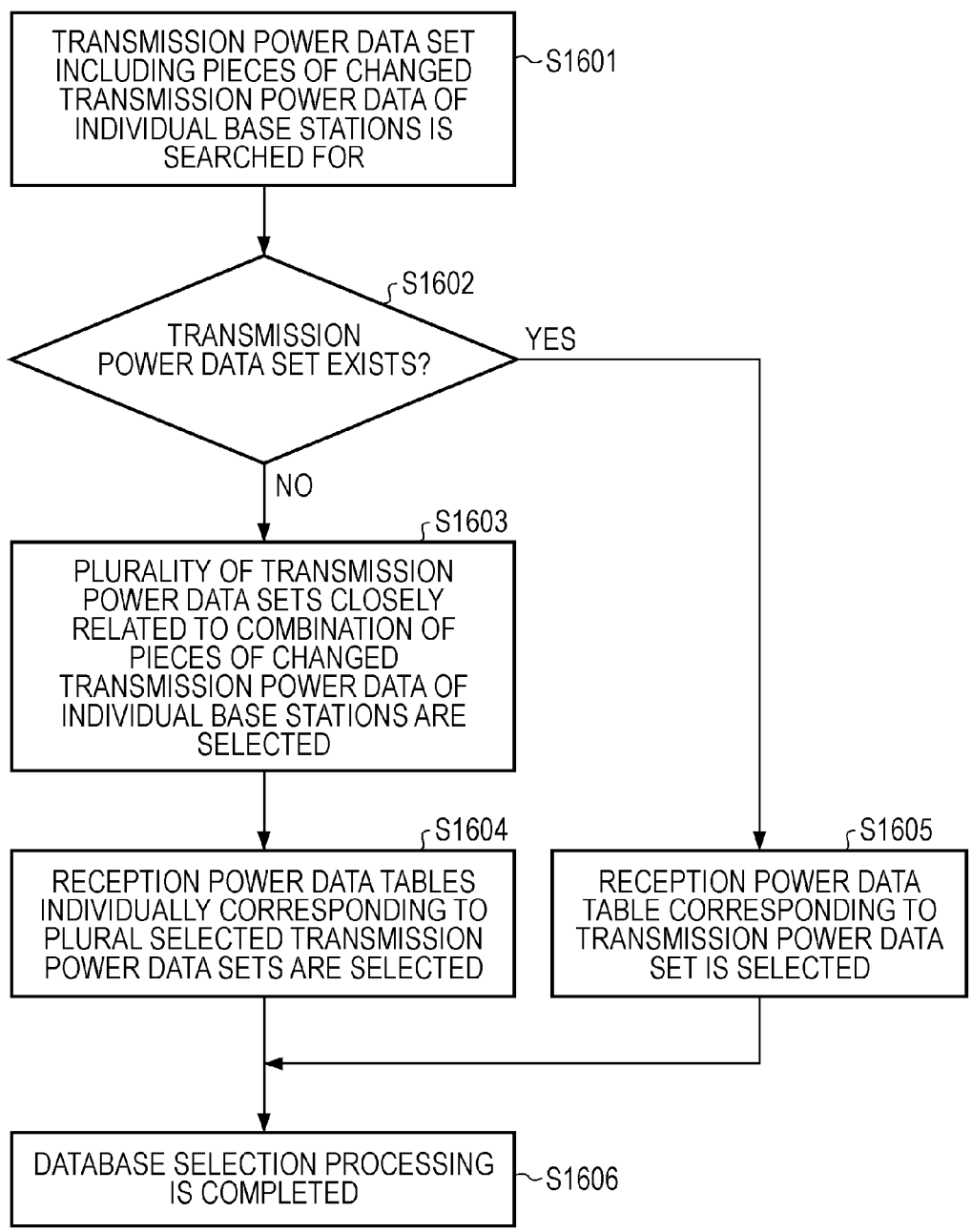
FIG. 16 is an exemplified diagram of a database selection processing flow, according to a second embodiment.

FIG. 16 is an exemplified diagram of a database selection processing flow, according to a second embodiment.

The database selection processing according to the second embodiment, illustrated in FIG. 16, is executed every time the transmission power of each base station 20 is adjusted owing to the wireless network optimization unit 612. For example, in the location detection processing sequence after connection of a mobile station, illustrated in FIG. 12, the mobile station location information management device 70 executes, as the process P1223 in FIG. 12, the database selection processing illustrated in FIG. 16.

In a step S1601, within the transmission power data set table already recorded in the storage unit 711*d*, the data search unit 711*b* searches for a transmission power data set including the pieces of the changed transmission power data of the individual base stations 20.

When, as a result of the search due to the data search unit 711*b*, the transmission power data set including the pieces of the changed transmission power data of the individual base stations 20 exists within the transmission power data set table (step S1602: "YES"), the processing proceeds to a step S1605. In the step S1605, as data used for the specific area detection processing, the data selection unit 711*c* selects a reception power data table corresponding to the transmission power data set including the pieces of the changed transmission power data of the individual base stations 20.

On the other hand, when, as a result of the search due to the data search unit 711*b*, a transmission power data set, which includes the pieces of the changed transmission power data of the individual base stations 20, does not exist within the transmission power data set table (step S1602: "NO"), the processing proceeds to a step S1603.

In the step S1603, within the transmission power data set table, the data search unit 711*b* searches for and selects a plurality of transmission power data sets closely related to the combination of the pieces of the changed transmission power data of the individual base stations 20.

For example, owing to the same processing operation as the processing operation described above as an example of the processing operation in the step S1305 in FIG. 13, the data search unit 711*b* searches for and selects first and second transmission power data sets.

In a step S1604, as data used for the specific area detection processing, the data selection unit 711*c* selects reception power data tables individually corresponding to the plural transmission power data sets selected by the data search unit 711*b*.

When the processing operations in the step S1601 to the step S1605 have been completed, the sequence of database selection processing operations is completed (S1606).

As described above, in the mobile communication system where the transmission power of the base station is adjusted, data within the database, used for detecting the location of the mobile station, is selected in accordance with the adjusted transmission power of the base station.

Therefore, according to the embodiment, even if the transmission power of the base station is changed, it may be possible to accurately detect the location of the mobile station 10.

After the mobile station location registration processing described above with reference to FIG. 12 or after the database selection processing described above with reference to FIG. 16, the location information utilization device 100 requests the location information of the mobile station 10 from the mobile station location information management device 70. In accordance with the location information request, the mobile station location information management device 70 detects the specific area of the mobile station 10 existing within the location detection target area, and informs the location information utilization device 100 of the detected specific area.

Next, mobile station location detection processing according to the second embodiment will be described with reference to FIG. 12 and FIG. 17. In addition, when, as a result of the processing operation due to the step S1605 in FIG. 16, the number of the reception power data tables already selected by the data selection unit 711*c* is one, the specific area detection processing according to the first embodiment is executed that is described with reference to FIG. 15.

Figure 17:
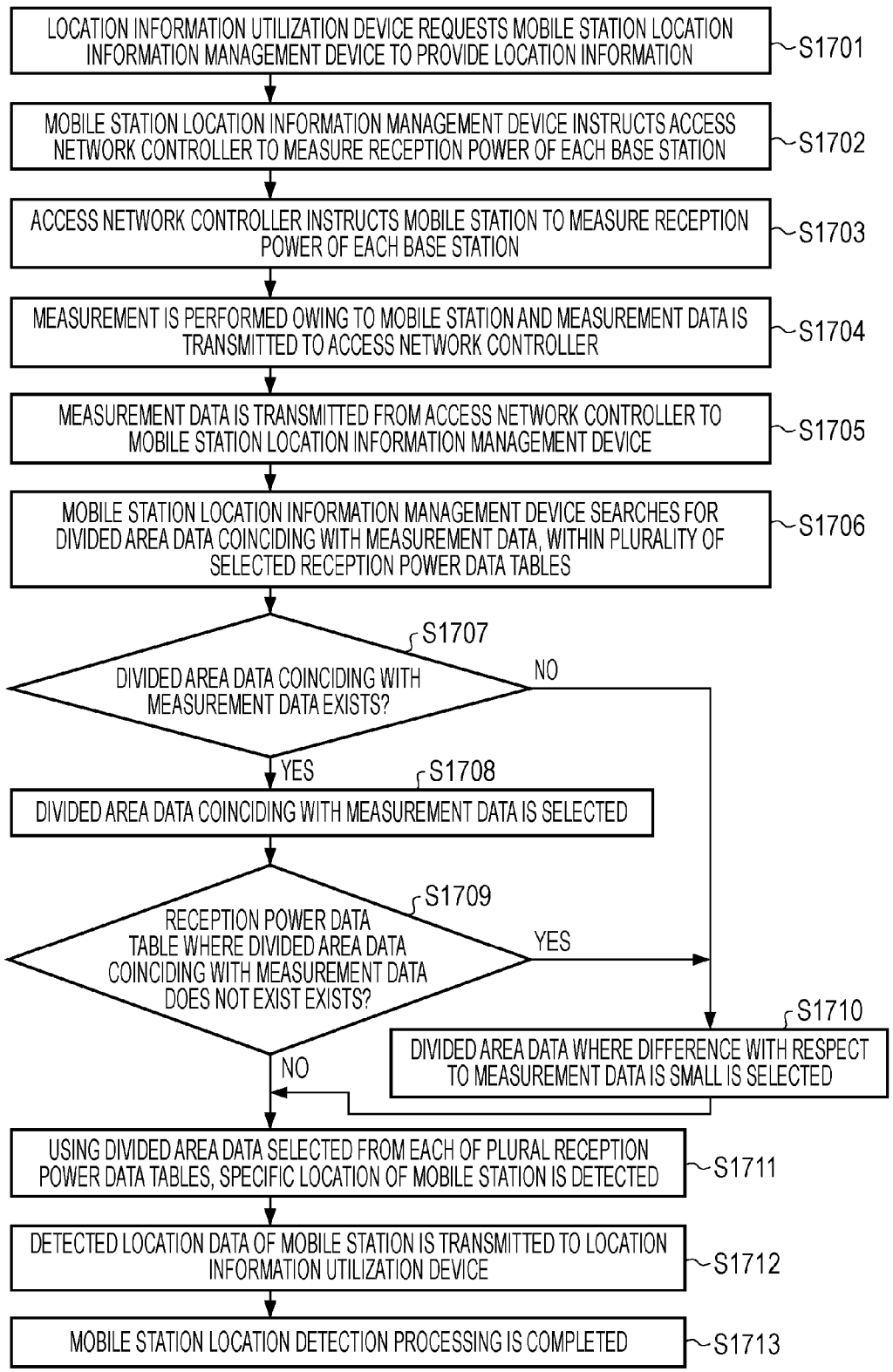
FIG. 17 is an exemplified diagram of a specific area detection processing flow, according to a second embodiment.

FIG. 17 is an exemplified diagram of a specific area detection processing flow, according to a second embodiment.

In a step S1701, the location information utilization device 100 requests the mobile station location information management device 70 to provide location information indicating a specific area within which the mobile station 10 exists (P1401).

In a step S1702, the mobile station location information management device 70 instructs the access network controller 50 to measure, in a location where the mobile station 10 exists, the reception power of a signal transmitted from each base station 20 (P1402). When having received the instruction from the mobile station location information management device 70, the access network controller 50 requests each base station 20 covering communication within the location detection target area to call the mobile station 10 (paging) (P1403).

When having received the call request from the access network controller 50, each base station 20 calls the mobile station 10 (P1404). When having received the call from the base station 20, the mobile station 10 sends a response corresponding to the call to a specific base station 20 having the cell 20*c* where the self-device 10 exists (P1405). The specific base station 20 having received the response from the mobile station 10 sends a response corresponding to the call to the access network controller 50 (P1406). In addition, sessions are established between the mobile station 10, the specific base station 20 having sent the call response, and the access network controller 50 (P1407).

In a step S1703, the access network controller 50 instructs, through the specific base station 20 (P1408), the mobile station 10 to measure the reception power of a signal transmitted from each base station 20 covering communication within the location detection target area (P1409).

In a step S1704, the mobile station 10 measures, in a location where the self-device 10 exists, the reception power of the signal transmitted from each base station 20 covering the communication within the location detection target area. In addition, the mobile station 10 transmits, through the specific base station 20 where a session has been established (P1411), a reception power data set including the measurement data of the measured reception power with respect to each base station 20, to the access network controller 50 (P1412).

In a step S1705, the access network controller 50 transmits, to the mobile station location information management device 70, the reception power data set received from the mobile station 10 (P1413).

Within the plural reception power data tables already selected by the data selection unit 711c, the mobile station location information management device 70 searches for divided area data having values equal or closely related to the pieces of the reception power data of the individual base stations 20, included in the reception power data set, and detects the location of the mobile station 10 (P1414). The detail of the processing operation in the process P1414 is, for example, as the following step S1706 to step S1711.

In the step S1706, the mobile station location detection unit 712b compares the reception power data set with each piece of divided area data within the plural reception power data tables already selected by the data selection unit 711c. In addition, within each of the plural reception power data tables already selected by the data selection unit 711c, the mobile station location detection unit 712b searches for divided area data coinciding with the reception power data set.

In the step S1707, with respect to each of the plural reception power data tables already selected by the data selection unit 711c, the mobile station location detection unit 712b determines whether or not divided area data coinciding with the reception power data set exists.

When divided area data coinciding with the reception power data set does not exist within one of the reception power data tables already selected by the data selection unit 711c (step S1707: "NO"), the processing proceeds to the step S1710.

On the other hand, when divided area data coinciding with the reception power data set exists within one of the reception power data tables already selected by the data selection unit 711c, the processing proceeds to the step S1708.

In the step S1708, the mobile station location detection unit 712b selects the divided area data coinciding with the reception power data set. In addition, in the step S1709, the mobile station location detection unit 712b determines whether or not a reception power data table where divided area data coinciding with the reception power data set does not exist exists within the plural reception power data tables already selected by the data selection unit 711c.

When a reception power data table where divided area data coinciding with the reception power data set does not exist does not exist (step S1709: "NO"), the divided area data coinciding with the reception power data set turns out to exist within each of the plural reception power data tables already selected by the data selection unit 711c. In this case, the processing proceeds to the step S1711.

On the other hand, a reception power data table exists where divided area data coinciding with the reception power data set does not exist (step S1709: "YES"), the processing proceeds to the step S1710.

In the step S1710, from the reception power data table where divided area data coinciding with the reception power data set does not exist, the mobile station location detection unit 712b selects divided area data where a difference with respect to the reception power data set is small.

For example, with respect to the reception power data table where divided area data coinciding with the reception power data set does not exist, the mobile station location detection unit 712b executes the same processing operation as the processing operation described above as an example of the processing operation in the S1509 in FIG. 15, and selects divided area data where a difference with respect to the reception power data set is small.

In the step S1711, using divided area data selected from each of the plural reception power data tables already selected by the data selection unit 711c, the mobile station location detection unit 712b detects a specific area where the mobile station 10 exists.

For example, when the area numbers x coincide with one another and the area numbers y coincide with one another, the area numbers x and the area numbers y being individually selected from the plural reception power data tables already selected by the data selection unit 711c, the mobile station location detection unit 712b detects a divided area indicated by the area number x and the area number y, as a specific area where the mobile station 10 exists.

On the other hand, when the area numbers x do not coincide with one another or the area numbers y do not coincide with one another, the area numbers x and the area numbers y being individually selected from the plural reception power data tables already selected by the data selection unit 711c, the mobile station location detection unit 712b detects, as a specific area where the mobile station 10 exists, a divided area calculated owing to weighted averaging utilizing the selected pieces of the divided area data.

For example, as described with illustrating FIG. 16, it is assumed that reception power data tables individually corresponding to the first and second transmission power data sets are selected as data used for the specific area detection processing. In addition, it is assumed that, from within the reception power data table corresponding to the first transmission power data set, divided area data where the area number of the X-axis is $m_a$ and the area number of the Y-axis is $n_a$ is selected in the step S1708 or the step S1710. In the same way, it is assumed that, from within the reception power data table corresponding to the second transmission power data set, divided area data where the area number of the X-axis is $m_b$ and the area number of the Y-axis is $n_b$ is selected. In this case, owing to the following processing, the mobile station location detection unit 712b detects a specific area where the mobile station 10 exists.

First, the mobile station location detection unit 712b calculates a data-to-data distance $L_a$ between the divided area data selected from within the reception power data table corresponding to the first transmission power data set and the reception power data set, using Expression (1). In the same way, the mobile station location detection unit 712b calculates a data-to-data distance $L_b$ between the divided area data selected from within the reception power data table corresponding to the second transmission power data set and the reception power data set.

Next, using the area numbers $m_a$ and $m_b$ of the X-axis, the area numbers $n_a$ and $n_b$ of the Y-axis, and the data-to-data distances $L_a$ and $L_b$, the mobile station location detection unit 712b calculates the area number $m_s$ of the X-axis and the area number $n_s$ of the Y-axis of a specific area where the mobile station 10 exists, in accordance with the following Expression (11) and Expression (12).

$$m_s = \mathrm{Int}\left\{\frac{L_b \times m_a + L_a \times m_b}{L_a + L_b}\right\} \quad \text{(Expression 11)}$$

$$n_s = \mathrm{Int}\left\{\frac{L_b \times n_a + L_a \times n_b}{L_a + L_b}\right\} \quad \text{(Expression 12)}$$

In Expression (11) and Expression (12), a function Int{A} indicates a function rounding the A to the nearest whole number.

In a step S1712, the mobile station location detection unit 712b transmits, to the location information utilization device 100, location information indicating the specific location of the mobile station 10, detected in the step S1711 (P1415).

In addition, the mobile station location detection unit 712b causes the mobile station location information holding unit 712c to hold the location information.

When the processing operations leading up to the step S1712 have been completed, the processing proceeds to a step S1713, and the sequence of specific area detection processing operations started from the step S1701 is completed.

As described above, in the mobile communication system where the transmission power of the base station is adjusted, the mobile station location information management device detects the location of the mobile station 10, using data within the database, selected or created in accordance with the adjusted transmission power of the base station. Therefore, according to the embodiment, even if the transmission power of the base station is changed, it may be possible to accurately the location of the mobile station 10.

In addition, according to the second embodiment, when there is no database coinciding with the adjusted transmission power of the base station, the location of the mobile station 10 is detected using a plurality of pieces of data within the database. Accordingly, it may be possible to more accurately detect a specific location where the mobile station 10 exists.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A mobile station location detection method performed in a mobile communication system where a base station management device changes transmission power of plural base stations in response to a communication state of a wireless network between a mobile station and the plural base stations, the mobile station location detection method comprising:

creating, by a mobile station location information management device included in the mobile communication system, a plurality of transmission power output data sets, each data set including individual pieces of transmission power data of the transmission power of the plural base stations by changing the transmission power of the plural base stations;

creating, by the mobile station location information management device, a plurality of reception power data tables configured to individually correspond to the created plurality of transmission power output data sets wherein each of the plurality of reception power data tables includes plural pieces of divided area data, each of which includes reception power data of signals transmitted from the plural base stations, the plural pieces of divided area data individually corresponding to a plurality of individual divided areas within a location detection target area where communication is covered by the plural base stations;

receiving, by the mobile station location information management device, a changed transmission power data set including individual pieces of changed transmission power data of the plural base stations from the base station management device and selecting a reception power data table corresponding to the received changed transmission power data set, from among the plurality of created reception power data tables, when the base station management device changes the transmission power of the plural base stations after the mobile station has moved into the location detection target area;

upon receiving a request for providing location information of the mobile station from an external device, instructing, by the mobile station location information management device, the mobile station to measure, in a location where the mobile station exists, pieces of reception power data of individual signals that are transmitted from the plural base stations at the changed transmission power; and receiving, by the mobile station location information management device, a reception power data set including the individual pieces of reception power data measured by the mobile station, detecting, as a specific location where the mobile station exists, a specific area indicated by divided area data where a difference with respect to the received reception power data set is minimum, within the selected reception power data table, and transmitting information indicating the detected specific location to the external device.

2. The mobile station location detection method according to claim 1, further comprising:

creating, by the mobile station location information management device, a reception power data table corresponding to the changed transmission power data set using the created plurality of reception power data tables when no transmission power data set coinciding with the changed transmission power data set exists within the created plurality of transmission power output data sets.

3. The mobile station location detection method according to claim 2, further comprising:

selecting, by the mobile station location management device, two transmission power data sets included in the created plurality of transmission power data sets wherein the individual pieces of the changed transmission power data of the plural base stations have values intermediate between individual pieces of transmission power data included in the two transmission power data sets and values of the two transmission power data sets are most closely related to the changed transmission power data set; and creating, by the mobile station location management device, a reception power data table corresponding to the changed transmission power data set, by performing weighted averaging on reception power data included in divided area data between reception power tables individually corresponding to the two selected transmission power data sets.

4. A mobile station location detection method performed in a mobile communication system where a base station management device changes transmission power of plural base stations in response to a communication state of a wireless network between a mobile station and the plural base stations, the mobile station location detection method comprising:

creating, by a mobile station location information management device included in the mobile communication system, a plurality of transmission power output data sets each including individual pieces of transmission power data of the plural base stations with changing the transmission power of the plural base stations;

creating, by the mobile station location information management device, a plurality of reception power data tables configured to individually correspond to the created plurality of transmission power output data sets wherein each of the plurality of reception power data tables includes plural pieces of divided area data, each of which includes reception power data of signals transmitted from the plural base stations, the plural pieces of divided area data individually corresponding to a plurality of individual divided areas within a location detection target area where communication is covered by the plural base stations;

receiving, by the mobile station location information management device, a changed transmission power data set including individual pieces of changed transmission power data of the plural base stations from the base station management device and selecting a reception power data table corresponding to the received changed transmission power data set, from among the plurality of created reception power data tables, when the base station management device changes the transmission power of the plural base stations after the mobile station has moved into the location detection target area;

upon receiving a request for providing location information of the mobile station from an external device, instructing, by the mobile station location information management device, the mobile station to measure, in a location where the mobile station exists, pieces of reception power data of individual signals that are transmitted from the plural base stations at the changed transmission power;

receiving, by the mobile station location information management device, a reception power data set including the individual pieces of reception power data measured by the mobile station, detecting, as a specific location where the mobile station exists, a specific area indicated by divided area data where a difference with respect to the received reception power data set is minimum, within the selected reception power data table, and transmitting information indicating the detected specific location to the external device;

creating, by the mobile station location information management device, a reception power data table corresponding to the changed transmission power data set using the created plurality of reception power data tables when no transmission power data set coinciding with the changed transmission power data set exists within the created plurality of transmission power output data sets;

selecting, by the mobile station location management device, two transmission power data sets included in the created plurality of transmission power data sets wherein individual pieces of transmission power data included in the two transmission power data sets have values smaller than the individual pieces of the changed transmission power data of the plural base stations and the two transmission power data sets are a first transmission power data set whose values are most closely related to the changed transmission power data set and a second transmission power data set whose values are second-most closely related to the changed transmission power data set;

comparing, by the mobile station location management device, a reception power data table corresponding to the selected first transmission power data set with a reception power data table corresponding to the second transmission power data set and individually calculating decreases in pieces of reception power data included in divided area data; and creating, by the mobile station location management device, a reception power data table corresponding to the changed transmission power data set of the plural base stations by adding the individual calculated decreases to individual pieces of reception power data included in divided area data within a reception power data table corresponding to the first transmission power data set.

5. A mobile station location detection method performed in a mobile communication system where a base station management device changes transmission power of plural base stations in response to a communication state of a wireless network between a mobile station and the plural base stations, the mobile station location detection method comprising:

creating, by a mobile station location information management device included in the mobile communication system, a plurality of transmission power output data sets each including individual pieces of transmission power data of the plural base stations with changing the transmission power of the plural base stations;

creating, by the mobile station location information management device, a plurality of reception power data tables configured to individually correspond to the created plurality of transmission power output data sets wherein each of the plurality of reception power data tables includes plural pieces of divided area data, each of which includes reception power data of signals transmitted from the plural base stations, the plural pieces of divided area data individually corresponding to a plurality of individual divided areas within a location detection target area where communication is covered by the plural base stations;

receiving, by the mobile station location information management device, a changed transmission power data set including individual pieces of changed transmission power data of the plural base stations from the base station management device and selecting a reception power data table corresponding to the received changed transmission power data set, from among the plurality of created reception power data tables, when the base station management device changes the transmission power of the plural base stations after the mobile station has moved into the location detection target area;

upon receiving a request for providing location information of the mobile station from an external device, instructing, by the mobile station location information management device, the mobile station to measure, in a location where the mobile station exists, pieces of reception power data of individual signals that are transmitted from the plural base stations at the changed transmission power;

receiving, by the mobile station location information management device, a reception power data set including the individual pieces of reception power data measured by the mobile station, detecting, as a specific location where the mobile station exists, a specific area indicated by divided area data where a difference with respect to the received reception power data set is minimum, within the selected reception power data table, and transmitting information indicating the detected specific location to the external device;

creating, by the mobile station location information management device, a reception power data table corresponding to the changed transmission power data set using the created plurality of reception power data tables when no transmission power data set coinciding with the changed transmission power data set exists within the created plurality of transmission power output data sets;

selecting, by the mobile station location management device, two transmission power data sets included in the created plurality of transmission power data sets wherein individual pieces of transmission power data included in the two transmission power data sets have values larger than the individual pieces of the changed transmission power data of the plural base stations and the two transmission power data sets are a first transmission power data set whose values are most closely related to the changed transmission power data set and a second transmission power data set whose values are second-most closely related to the changed transmission power data set;

comparing, by the mobile station location management device, a reception power data table corresponding to the selected first transmission power data set with a reception power data table corresponding to the second transmission power data set and individually calculating increases in pieces of reception power data included in divided area data; and creating, by the mobile station location management device, a reception power data table corresponding to the changed transmission power data set of the plural base stations by subtracting the individual calculated increases from individual pieces of reception power data included in divided area data within the reception power table corresponding to the first transmission power data set.

6. A mobile station location detection method performed in a mobile communication system where a base station management device changes transmission power of plural base stations in response to a communication state of a wireless network between a mobile station and the plural base stations, the mobile station location detection method comprising:

creating, by a mobile station location information management device included in the mobile communication system, a plurality of transmission power output data sets each including individual pieces of transmission power data of the plural base stations with changing the transmission power of the plural base stations;

creating, by the mobile station location information management device, a plurality of reception power data tables configured to individually correspond to the created plurality of transmission power output data sets wherein each of the plurality of reception power data tables includes plural pieces of divided area data, each of which includes reception power data of signals transmitted from the plural base stations, the plural pieces of divided area data individually corresponding to a plurality of individual divided areas within a location detection target area where communication is covered by the plural base stations;

receiving, by the mobile station location information management device, a changed transmission power data set including individual pieces of changed transmission power data of the plural base stations from the base station management device and selecting a reception power data table corresponding to the received changed transmission power data set, from among the plurality of created reception power data tables, when the base station management device changes the transmission power of the plural base stations after the mobile station has moved into the location detection target area;

upon receiving a request for providing location information of the mobile station from an external device, instructing, by the mobile station location information management device, the mobile station to measure, in a location where the mobile station exists, pieces of reception power data of individual signals that are transmitted from the plural base stations at the changed transmission power;

receiving, by the mobile station location information management device, a reception power data set including the individual pieces of reception power data measured by the mobile station, detecting, as a specific location where the mobile station exists, a specific area indicated by divided area data where a difference with respect to the received reception power data set is minimum, within the selected reception power data table, and transmitting information indicating the detected specific location to the external device;

selecting, by the mobile station location management device, two or more transmission power data sets whose values are most closely related to the changed transmission power data set from among the created plurality of transmission power data sets when no transmission power data set coinciding with the changed transmission power data set exists within the created plurality of transmission power data sets; and upon receiving a request for providing location information of the mobile station, individually selecting, by the mobile station location management device, from two or more reception power data tables respectively corresponding to the selected two or more transmission power data sets, pieces of divided area data where differences with respect to the reception power data set are minimum and detecting, as a specific location where the mobile station exists, a specific area indicated by divided area data calculated owing to weighted averaging utilizing the individual pieces of the selected divided area data.

7. The mobile station location detection method according to claim 6, further comprising:

selecting, by the mobile station location management device, two transmission power data sets included in the created plurality of transmission power data sets wherein the individual pieces of the changed transmission power data of the plural base stations have values intermediate between individual pieces of transmission power data included in the two transmission power data sets and values of the two transmission power data sets are most closely related to the changed transmission power data set.

8. A mobile communication system comprising:

a mobile station;

plural base stations each configured to be directly connectable to the mobile station;

a base station management device configured to change transmission power of the plural base stations in response to a communication state of a wireless network between the mobile station and the plural base stations; and a mobile station location information management device configured to manage location information of the mobile station, wherein the mobile station location information management device:

creates a plurality of transmission power output data sets, each data set including individual pieces of transmission power data of the transmission power of the plural base stations by changing the transmission power of the plural base stations;

creates a plurality of reception power data tables configured to individually correspond to the created plurality of transmission power output data sets wherein each of the plurality of reception power data tables includes plural pieces of divided area data, each of which includes reception power data of signals transmitted from the plural base stations, the plural pieces of divided area data individually corresponding to a plurality of individual divided areas within a location detection target area where communication is covered by the plural base stations;

receives a changed transmission power data set including individual pieces of changed transmission power data of the plural base stations from the base station management device and selects a reception power data table corresponding to the received changed transmission power data set from among the created plurality of reception power data tables when the base station management device has changed the transmission power of the plural base stations after the mobile station has moved into the location detection target area;

upon receiving a request for providing location information of the mobile station from an external device, instructs the mobile station to measure, in a location where the mobile station exists, pieces of reception power data of individual signals transmitted from the plural base stations with the changed transmission power; and receives a reception power data set including the individual pieces of reception power data measured by the mobile station, detects, as a specific location where the mobile station exists, a specific area indicated by divided area data where a difference with respect to the received reception power data set is minimum, within the selected reception power data table, and transmits information indicating the detected specific location to the external device.

9. A mobile station location information management device comprising:

a database creation unit configured to create a plurality of transmission power output data sets, each data set including individual pieces of transmission power data of the transmission power of plural base stations directly connectable to a mobile station by changing transmission power of the plural base stations and create a plurality of reception power data tables configured to individually correspond to the created plurality of transmission power output data sets wherein each of the plurality of reception power data tables includes plural pieces of divided area data, each of which includes reception power data of signals transmitted from the plural base stations, the plural pieces of divided area data individually corresponding to a plurality of individual divided areas within a location detection target area where communication is covered by the plural base stations;

a data selection unit configured to receive a changed transmission power data set including individual pieces of changed transmission power data of the plural base stations from the base station management device and select a reception power data table corresponding to the received changed transmission power data set from among the created plurality of reception power data tables when a base station management device configured to change transmission power of the plural base stations in response to a communication state of a wireless network between the mobile station and the plural base stations has changed the transmission power of the plural base stations after the mobile station has moved into the location detection target area; and a mobile station location detection unit configured to, upon receiving a request for providing location information of the mobile station from an external device, instruct the mobile station to measure, in a location where the mobile station exists, pieces of reception power data of individual signals transmitted from the plural base stations with the changed transmission power, receive a reception power data set including the individual pieces of reception power data measured by the mobile station, detect, as a specific location where the mobile station exists, a specific area indicated by divided area data where a difference with respect to the received reception power data set is minimum, within the selected reception power data table, and transmit information indicating the detected specific location to the external device.

* * * * *